(12) United States Patent
Tyrrell et al.

(10) Patent No.: US 8,260,831 B2
(45) Date of Patent: *Sep. 4, 2012

(54) SYSTEM AND METHOD FOR IMPLEMENTING A FLEXIBLE STORAGE MANAGER WITH THRESHOLD CONTROL

(75) Inventors: John Charles Tyrrell, San Jose, CA (US); Konstantinos Roussos, Sunnyvale, CA (US); Peter Logan Smoot, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 11/394,802

(22) Filed: Mar. 31, 2006

(65) Prior Publication Data

US 2007/0239793 A1    Oct. 11, 2007

(51) Int. Cl.
*G06F 7/00* (2006.01)
(52) U.S. Cl. ............................................. 707/823
(58) Field of Classification Search .................. None
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,849,879 A * | 7/1989 | Chinnaswamy et al. | 706/45 |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,062,055 A * | 10/1991 | Chinnaswamy et al. | 702/182 |
| 5,124,987 A | 6/1992 | Milligan et al. | |
| 5,129,088 A * | 7/1992 | Auslander et al. | 711/1 |
| RE34,100 E | 10/1992 | Hartness | |
| 5,155,835 A | 10/1992 | Belsan | |
| 5,426,747 A | 6/1995 | Weinreb et al. | |
| 5,568,629 A | 10/1996 | Gentry et al. | |

(Continued)

FOREIGN PATENT DOCUMENTS

WO    WO 89/10594    11/1989

OTHER PUBLICATIONS

Administration Guide found at http://www.openafs.org/pages/doc/AdminGuide/auagd010.htm, visited on Mar. 2, 2005.

(Continued)

*Primary Examiner* — Neveen Abel Jalil
*Assistant Examiner* — Kellye Buckingham
(74) *Attorney, Agent, or Firm* — Cesari and McKenna, LLP

(57) ABSTRACT

A system and method for implementing storage management with threshold control is provided. A flexible storage manager associates storage devices having a similar performance characteristic into logical constructs called storage groups. Storage groups having the same performance characteristic from a plurality of storage systems are organized into storage pools. The flexible storage manager automatically provisions storage on a storage pool basis. Should a low threshold utilization be exceeded, the flexible storage manager performs a set of management policies to lower the utilization of a storage pool to the low threshold.

22 Claims, 18 Drawing Sheets

U.S. PATENT DOCUMENTS

| | | | |
|---|---|---|---|
| 5,581,724 | A | 12/1996 | Belsan et al. |
| 5,819,292 | A | 10/1998 | Hitz et al. |
| 6,438,642 | B1 | 8/2002 | Shaath ............................ 711/100 |
| 6,516,380 | B2 | 2/2003 | Kenchammana-Hoskote et al. |
| 6,636,879 | B1 | 10/2003 | Doucette et al. |
| 6,643,654 | B1 | 11/2003 | Patel et al. |
| 6,993,587 | B1 | 1/2006 | Basani et al. |
| 7,024,517 | B1* | 4/2006 | Zahavi ............................ 711/114 |
| 7,055,014 | B1 | 5/2006 | Pawlowski |
| 7,171,452 | B1* | 1/2007 | Gole ................................ 709/212 |
| 7,194,597 | B2 | 3/2007 | Willis et al. |
| 7,219,192 | B2* | 5/2007 | Yasukawa et al. ............. 711/112 |
| 7,308,563 | B2* | 12/2007 | Samra ............................ 712/217 |
| 7,409,494 | B2 | 8/2008 | Edwards et al. |
| 7,443,845 | B2* | 10/2008 | Gai et al. ....................... 370/389 |
| 7,451,286 | B2 | 11/2008 | Nadathur |
| 7,668,175 | B2* | 2/2010 | Johnson et al. ........... 370/395.41 |
| 2002/0129128 | A1* | 9/2002 | Gold et al. ...................... 709/220 |
| 2003/0037187 | A1* | 2/2003 | Hinton et al. ....................... 710/1 |
| 2003/0046270 | A1* | 3/2003 | Leung et al. ....................... 707/1 |
| 2003/0140147 | A1* | 7/2003 | Gavish et al. ................. 709/227 |
| 2004/0030668 | A1 | 2/2004 | Pawlowski et al. |
| 2004/0117408 | A1* | 6/2004 | Bharadwaj et al. ........... 707/200 |
| 2004/0243699 | A1* | 12/2004 | Koclanes et al. .............. 709/224 |
| 2005/0033757 | A1* | 2/2005 | Greenblatt et al. ........... 707/100 |
| 2005/0165722 | A1* | 7/2005 | Cannon et al. ..................... 707/1 |
| 2005/0216687 | A1* | 9/2005 | Fu .................................. 711/165 |
| 2005/0246401 | A1 | 11/2005 | Edwards et al. |
| 2006/0064481 | A1* | 3/2006 | Baron et al. ................... 709/224 |
| 2006/0064485 | A1* | 3/2006 | Baron et al. ................... 709/224 |
| 2006/0064486 | A1* | 3/2006 | Baron et al. ................... 709/224 |
| 2006/0092845 | A1* | 5/2006 | Kwan et al. .................... 370/235 |
| 2006/0218362 | A1 | 9/2006 | McManis |
| 2007/0088702 | A1 | 4/2007 | Fridella et al. |
| 2007/0098014 | A1* | 5/2007 | Pomaranski et al. ......... 370/468 |
| 2007/0233868 | A1 | 10/2007 | Tyrrell |
| 2008/0098453 | A1* | 4/2008 | Hinton et al. ...................... 726/1 |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Hitz, David, et al. *System and Method for Enabling a Storage System to Support Multiple Volume Formats Simultaneously*, USPTO U.S. Appl. No. 60/652,626, filed Feb. 14, 2005.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. and Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland, OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

U.S. Appl. No. 10/423,391 entitled System and Method for Reserving Space to Guarantee File Writability in a File System Supporting Persistent Consistency Point Images, filed Apr. 25, 2003 by Peter F. Corbett et al.

* cited by examiner

SYSTEM AND METHOD FOR IMPLEMENTING A FLEXIBLE STORAGE MANAGER WITH THRESHOLD CONTROL

FIELD OF THE INVENTION

The present invention relates to storage management and, more specifically, to storage management with threshold control across a plurality of storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer, i.e., direct attached storage (DAS). The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Typically, the amount of data managed by a storage system continually grows at prodigious rates. However, the number of people (e.g. storage administrators) managing storage generally does not grow at the same rate due to increased human resource cost. This results in additional workload for the storage administrators, especially in enterprise level storage installations. One noted disadvantage of many storage system environments is that conventional techniques for storage provisioning are inefficient both in human capital and in unused but allocated storage space. A typical provisioning process begins with a user estimating his storage needs and making a personal request to a storage administrator to create a logical unit number (LUN) of a certain size. While this description is written in terms of LUNs, the same procedure applies to requests for storage in NAS space, e.g., a NFS volume. Once the request has been approved by e.g., management, the storage administrator must find an appropriate array with sufficient space and within the zoning constraints of the overall storage system environment. After any particular zoning issues have been decided, the storage administrator then must choose a storage system within the constraints and create the appropriate LUN. This may require the storage administrator to first create a volume and then create a virtual disk on the volume to be exported as the LUN.

Once these decisions have been made, the LUN may be exported to a host, which may then mount the LUN for access. There is typically no follow up to ensure that the requested space is actually being utilized. A noted disadvantage of current storage provisioning techniques is that most storage is less than 35% utilized, which results in a subtotal industry loss, estimated at e.g., $20 billion per year. This wasted storage space is the result of users overestimating their actual storage needs and requesting extraneous space from the storage administrator.

Additionally, there exists no efficient technique for determining the actual rate of data growth within a storage system. Thus, storage administrators are forced to guess at storage requirements and when additional storage should be procured. When available storage space becomes low, the storage administrators must procure additional storage to meet user demands, even though there may be significant amounts of wasted storage available within the storage system environment as a whole.

SUMMARY OF THE INVENTION

The present invention overcomes the disadvantages of the prior art by providing a system and method for implementing storage management with threshold control. A flexible storage manager (FSM) manages provisioning of storage for users to thereby enable greater storage utilization. The FSM is illustratively implemented as one or more software models executing on a computer within a storage system environment and having a user interface that facilitates interaction with a user. The FSM organizes storage devices associated within a single storage system and having the same performance characteristics into a logical construct called a "storage group" and further organizes storage groups having identical performance characteristics across storage systems into logical constructs called "storage pools." Notably, the use of storage pools and storage groups eliminates the need for a storage administrator to locate an appropriate extent of space to be formed when processing storage for the user.

In order to provision storage, a user first logs into the FSM and requests storage space. The FSM selects an appropriate storage group within a storage pool and generates a thinly provisioned volume. As used herein, a thinly provisioned volume is defined as a volume whose contents are not completely written to the storage device at the time of its creation. The FSM also prepares appropriate mapping and export functionality necessary for the user to access the requested storage. This provisioning process may be easily automated since all storage within the storage system environment is organized into storage groups and storage pools. As such, the FSM has an overall view of all storage available in the storage system environment.

Additionally, a threshold control capacity planning capability is utilized within the storage system environment to provide the storage administrator with the ability to monitor actual data growth and to make adequate plans for storage expansion. To that end, the administrator sets low and high threshold values for storage utilization of storage pools. At regular intervals, the FSM obtains the current utilization rates of the storage pools within the storage system environment. If the current utilization is below the low threshold, the FSM stores a capacity planning record that tracks actual data growth. If the current utilization is greater than the low threshold, the FSM manages the storage pool according to a set of policies including, e.g., deletion and/or migration of data to bring the occupancy level back to the low threshold. The FSM stores a capacity planning record to indicate the quantity of data that was freed to reach the low threshold value.

The FSM may utilize the capacity planning records to chart the actual data growth on a storage pool basis to enable the storage administrator to determine when, and if, additional physical storage is required. Furthermore, such actual data growth charts may be utilized to enable the storage administrator to better manage the storage system capacity. The FSM may easily determine the actual data utilization and data growth rate as compared to artificial growth rates available from the prior art by examining the requested space. By utilizing the actual data growth rate, more accurate and improved storage management may be performed.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
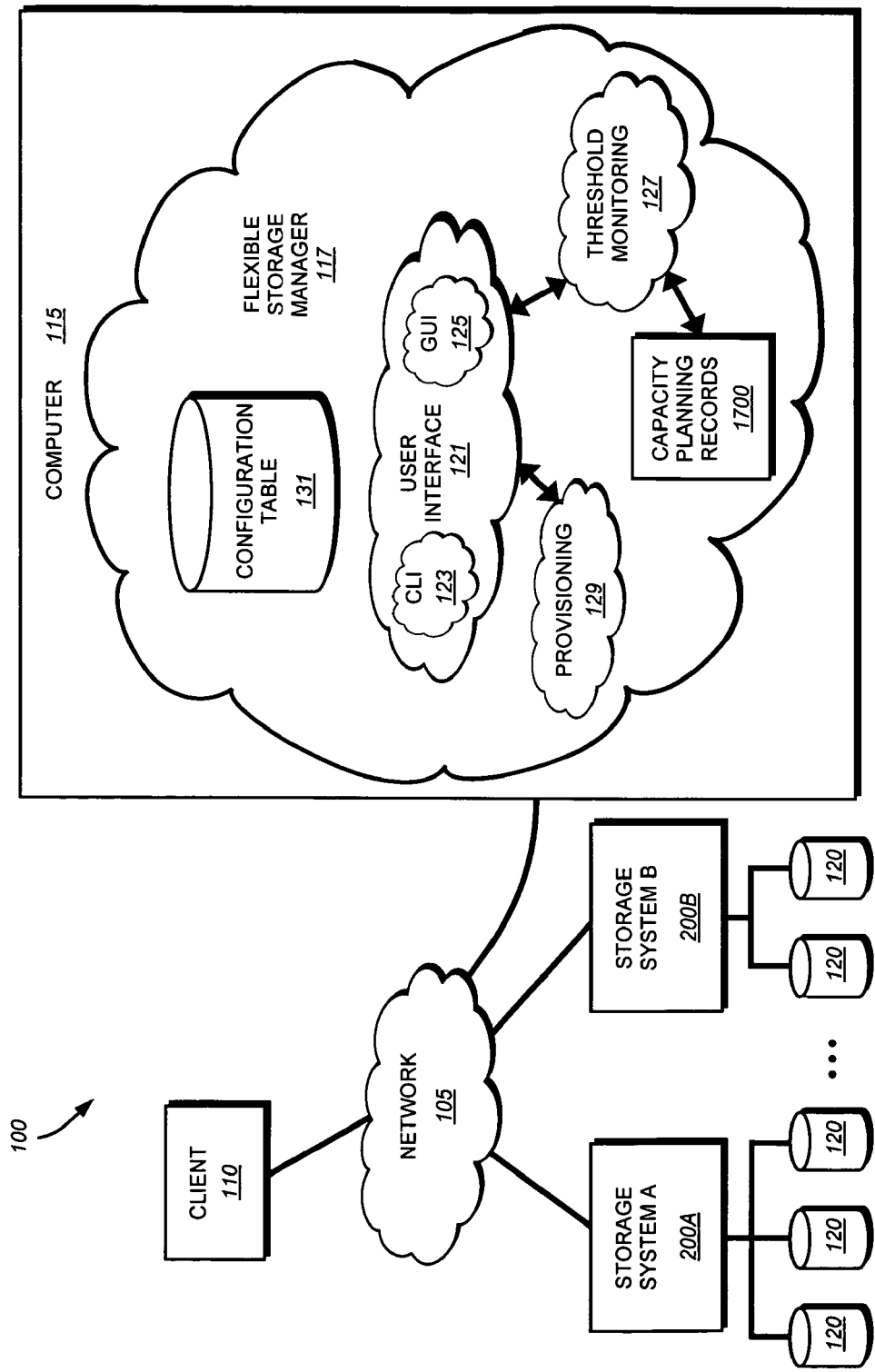
FIG. 1 is a schematic block diagram of an exemplary network storage system environment showing a flexible storage manager in accordance with an embodiment of the present invention.

FIG. 1 is a schematic block diagram of an exemplary storage system environment 100 in accordance with an embodiment of the present invention. The storage system environment 100 comprises a plurality of storage systems 200A, B operatively interconnected with one or more storage devices 120, such as disks. A network 105 connects a storage system 200 with a plurality of clients 110. Also connected to the network 105 is a computer 115 executing a flexible storage manager (FSM) 117 in accordance with an embodiment of the present invention.

The FSM 117 comprises a plurality of modules including a user interface module (UI) 121 that includes a command line interface (CLI) 123 and/or a graphical user interface (GUI) 125. A provisioning module 127 permits automatic provisioning of storage using storage pools and/or storage groups, as described further below. A threshold monitoring module 129 implements threshold monitoring of the present invention, described further below. One or more capacity planning records 1700, which may be persistently stored, are utilized by the threshold monitoring module 127 for tracking actual data growth in accordance with an embodiment of the present invention. A configuration table 131 stores information relating to the assignment of aggregates to storage groups and storage pools, described further below. The FSM is illustratively implemented as one or more software modules executing on a computer within the storage system environment. However, in alternate embodiments, the functionality of the FSM may be integrated with a storage system 200 or a storage operating system 300 executing on a storage system. As such, the description of a FSM executing on a separate computer within the storage system environment should be taken as exemplary only.

B. Storage System

Figure 2:
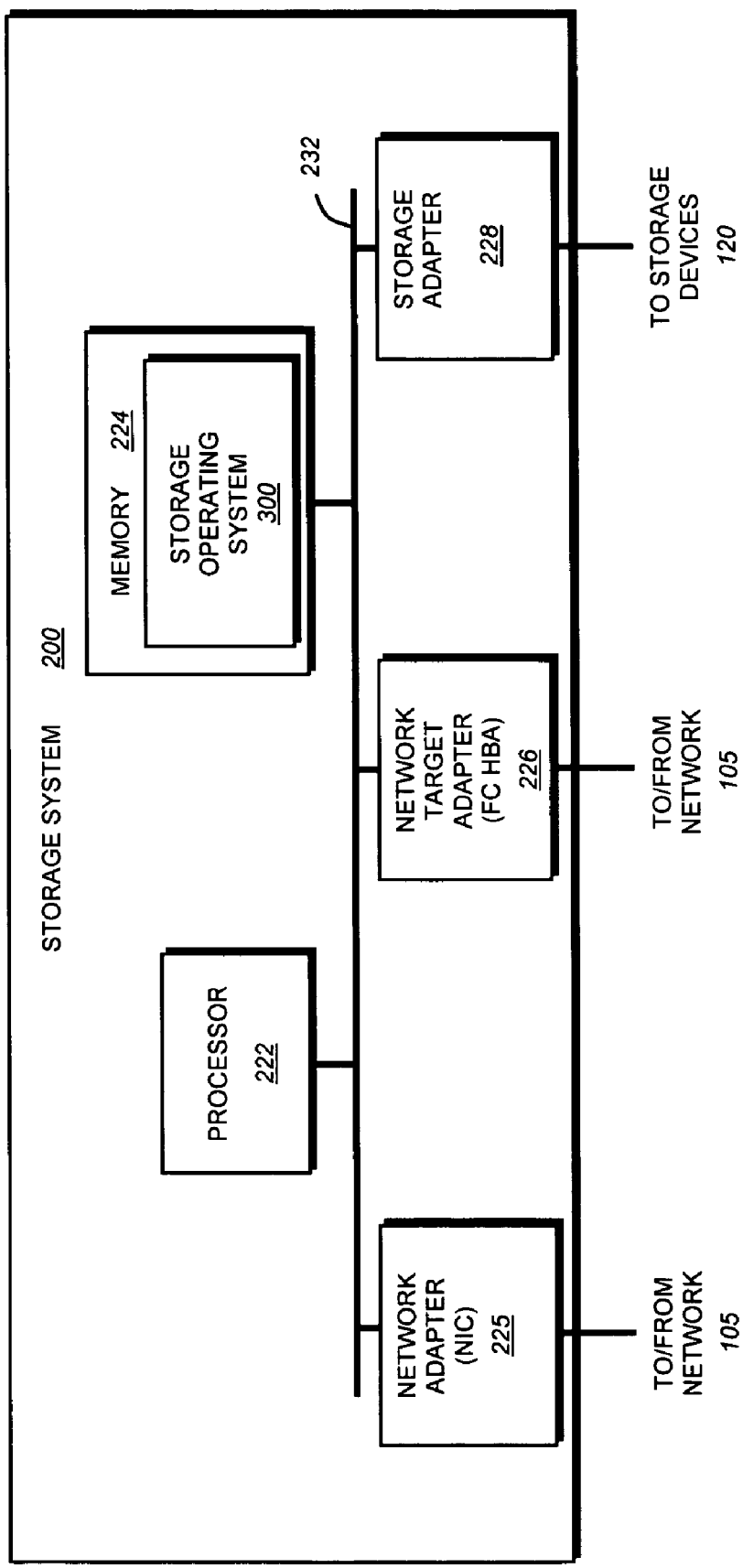
FIG. 2 is a schematic block diagram of an exemplary storage system in accordance with an embodiment of the present invention.

FIG. 2 is a schematic block diagram of an illustrative storage system 200 that may be advantageously used with the present invention. The storage system is configured to provide storage service for both file and block protocol access to information stored on storage devices in an integrated manner. In this context, the storage system denotes a computer having features such as simplicity of storage service management and ease of storage reconfiguration, including reusable storage space, for users (system administrators) and clients of network attached storage (NAS) and storage area network (SAN) deployments. It should be noted that a single storage system may support both NAS and SAN simultaneously. An example of such a storage system is described in U.S. Pat. No. 7,873,700, issued on Jan. 18, 2011, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., the contents of which are hereby incorporated by reference.

The storage system 200 is illustratively embodied as a storage appliance comprising a processor 222, a memory 224, a plurality of network adapters 225, 226 and a storage adapter 228 interconnected by a system bus 232. The storage appliance also includes a storage operating system 300 that provides a virtualization system (and, in particular, a file system) to logically organize the information as a hierarchical structure of named data containers, such as directory, file and virtual disk (vdisk) storage objects on storage devices, such as disks.

The clients of a SAN-based network environment have a storage viewpoint of blocks or disks. To that end, the storage system 200 presents (exports) disks to SAN clients through the creation of logical unit numbers (LUNs) or vdisk objects. A vdisk object (hereinafter "vdisk") is a special file type that is implemented by the virtualization system and translated into an emulated disk as viewed by the SAN clients. The storage system thereafter makes these emulated disks accessible to the SAN clients through controlled exports.

In the illustrative embodiment, the memory 224 comprises storage locations that are addressable by the processor and adapters for storing software program code and data structures associated with the present invention. A portion of memory 224 may be organized as a "buffer cache" for storing data structures for use by the storage operating system during runtime operation. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 225 may comprise a network interface controller (NIC) that couples the storage appliance to a plurality of clients over point-to-point links, wide area networks, virtual private networks implemented over a public network (Internet) or a shared local area network. The NIC comprises the mechanical, electrical and signaling circuitry needed to connect the appliance to a network.

The storage network "target" adapter 226 also couples the storage appliance to clients that may be further configured to access the stored information as blocks or disks. The network target adapter 226 may comprise a FC host bus adapter (HBA) having the mechanical, electrical and signaling circuitry needed to connect the appliance to a SAN network switch. In addition to providing FC access, the FC HBA may offload fiber channel network processing operations for the storage appliance.

The storage adapter 228 cooperates with the storage operating system 300 executing on the storage appliance to access information requested by the clients. The information may be stored on disks or other similar media adapted to store information. The storage adapter includes I/O interface circuitry that couples to the disks 120 over an I/O interconnect arrangement, such as a conventional high-performance, FC serial link topology. The information is retrieved by the storage adapter and, if necessary, processed by the processor 222 (or the adapter 228 itself) prior to being forwarded over the system bus 223 to the network adapters 225, 226, where the information is formatted into packets or messages and returned to the clients.

Storage of information on the storage system 200 is preferably implemented as one or more storage volumes that comprise a cluster of physical storage disks 120, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

One or more virtual disks (vdisks) may be stored within each volume. A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within the file system of the storage system. As used herein, a set of stream inodes denotes one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section. An example of a stream inode object that may be advantageously used with the present invention is described in U.S. Pat. No. 6,643,654 titled SYSTEM AND METHOD FOR REPRESENTING NAMED DATA STREAMS WITHIN AN ON-DISK STRUCTURE OF A FILE SYSTEM, by Kayuri Patel et al., which is hereby incorporated by reference as though fully set forth herein.

B. Storage Operating System

To facilitate access to the disks, the storage operating system 300 implements a write-anywhere file system that cooperates with virtualization modules to provide a function that "virtualizes" the storage space provided by disks. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
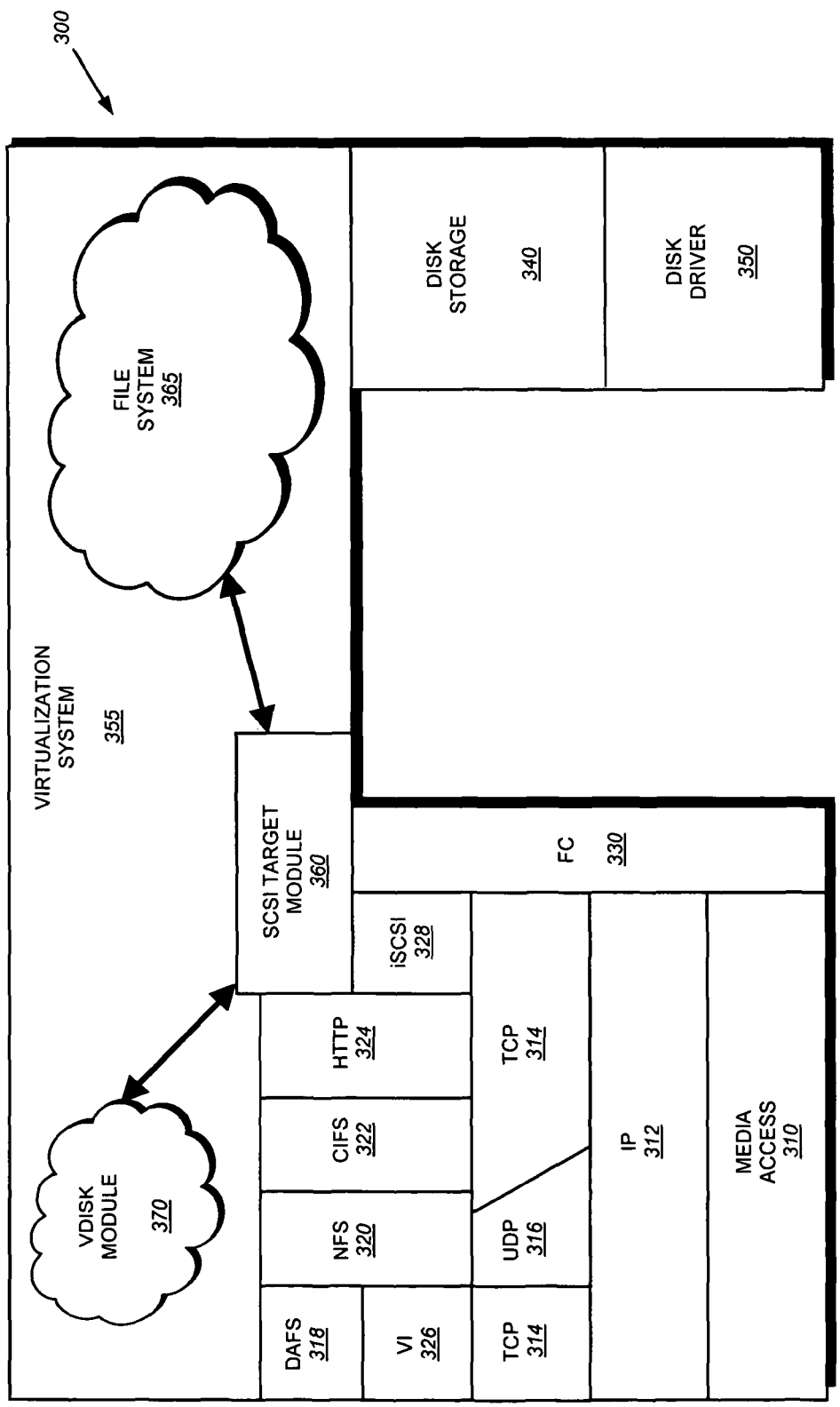
FIG. 3 is a schematic block diagram of an exemplary storage operating system for use on a storage system in accordance with an embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates with the FC HBA 226 to receive and transmit block access requests and responses to and from the integrated storage appliance. The FC and iSCSI drivers provide FC-specific and iSCSI-specific access control to the LUNs (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system 365 and SCSI target module 360 can be implemented in software, hardware, firmware, or a combination thereof. The vdisk module 370 interacts with the file system 365 to enable access by administrative interfaces in response to a system administrator issuing commands to the multi-protocol storage appliance 200. In essence, the vdisk module 370 manages SAN deployments by, among other things, implementing a comprehensive set of vdisk (LUN) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or LUN by providing a mapping procedure that translates LUNs into the special vdisk file types. The SCSI target module is illustratively disposed between the FC and iSCSI drivers 330, 328 and the file system 365 to thereby provide a translation layer of the virtualization system 355 between the SAN block (LUN) space and the file system space, where LUNs are represented as vdisks. By "disposing" SAN virtualization over the file system 365, the multi-protocol storage appliance reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al, the contents of which are hereby incorporated by reference.

Operationally, a request from the client 110 is forwarded as a packet over the computer network 105 and onto the storage system 200 where it is received at the network adapter 225, 226. A network driver processes the packet and, if appropriate, passes it on to a network protocol and file access layer for additional processing prior to forwarding to the write-anywhere file system 365. Here, the file system generates operations to load (retrieve) the requested data from disk 120 if it is not resident "in-core," i.e., in the buffer cache. If the information is not in the cache, the file system 365 indexes into the inode file using the inode number to access an appropriate entry and retrieve a logical volume block number (vbn). The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk 120 and loads the requested data block(s) in buffer cache for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 200 in response to a request issued by client 110. Moreover, in another alternate embodiment of the invention, the processing elements of adapters 225, 226, may be configured to offload some or all of the packet processing and storage access operations, respectively, from processor 222, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 200. An example of a storage appliance that may be advantageously used with the present invention is described in U.S. Pat. No. 7,873,700, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

E. File System Organization

Figure 4:
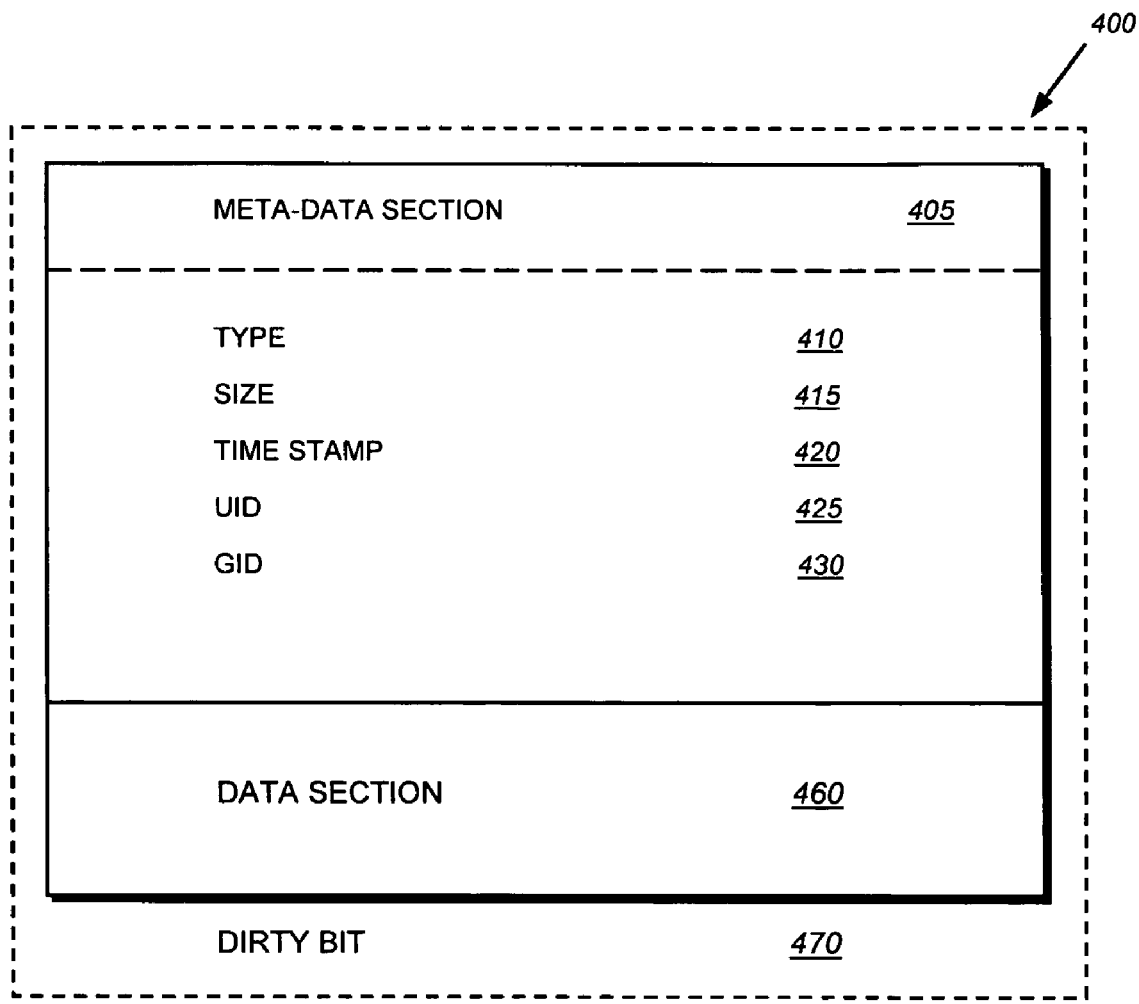
FIG. 4 it is a schematic block diagram of an exemplary inode in accordance with an embodiment of the present invention.

In the illustrative embodiment, a data container is represented in the write-anywhere file system as an inode data structure adapted for storage on the disks 120. FIG. 4 is a schematic block diagram of an inode 400, which preferably includes a meta-data section 405 and a data section 460. The information stored in the meta-data section 405 of each inode 400 describes the data container (e.g., a file) and, as such, includes the type (e.g., regular, directory, vdisk) 410 of file, its size 415, time stamps (e.g., access and/or modification time) 420 and ownership, i.e., user identifier (UID 425) and group ID (GID 430), of the file. The contents of the data section 460 of each inode may be interpreted differently depending upon the type of file (inode) defined within the type field 410. For example, the data section 460 of a directory inode contains meta-data controlled by the file system, whereas the data section of a regular inode contains file system data. In this latter case, the data section 460 includes a representation of the data associated with the file.

Specifically, the data section 460 of a regular on-disk inode may include file system data or pointers, the latter referencing 4 kB data blocks on disk used to store the file system data. Each pointer is preferably a logical vbn to facilitate efficiency among the file system and the RAID system 340 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 460 of the inode (e.g., a second level inode) references an indirect block (e.g., a first level L1 block) that contains 1024 pointers, each of which references a 4 kB data block on disk. For file system data having a size greater than 64 MB, each pointer in the data section 460 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 kB data block on disk. When accessing a file, each block of the file may be loaded from disk 120 into the memory 224.

When an on-disk inode (or block) is loaded from disk 120 into memory 224, its corresponding in-core structure embeds the on-disk structure. For example, the dotted line surrounding the inode 400 indicates the in-core representation of the on-disk inode structure. The in-core structure is a block of memory that stores the on-disk structure plus additional information needed to manage data in the memory (but not on disk). The additional information may include, e.g., a "dirty" bit 470. After data in the inode (or block) is updated/modified as instructed by, e.g., a write operation, the modified data is marked "dirty" using the dirty bit 470 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., issued on Oct. 6, 1998.

Figure 5:
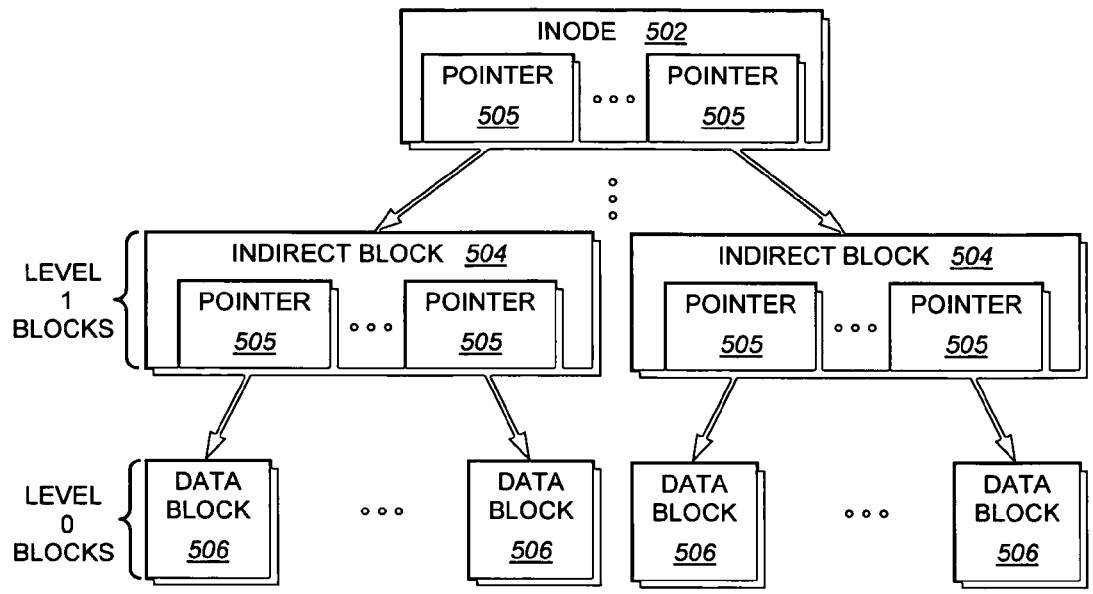
FIG. 5 is a schematic block diagram of an exemplary buffer tree in accordance with an embodiment of the present invention.

FIG. 5 is a schematic block diagram of an embodiment of a buffer tree of a file that may be advantageously used with the present invention. The buffer tree is an internal representation of blocks for a file (e.g., file 500) loaded into the memory 224 and maintained by the write-anywhere file system 365. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pointers 505 that ultimately reference data blocks 506 used to store the actual data of the file. That is, the data of file 500 are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system. An example of such a file system layout is described in U.S. Pat. No. 7,409,494, issued Aug. 5, 2008, entitled EXTENSION OF WRITE ANYWHERE FILE SYSTEM LAYOUT, by John K. Edwards, et al. and assigned to Network Appliance, Inc. The underlying physical volume is an aggregate comprising one or more groups of disks, such as RAID groups. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space.

Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 500) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 6:
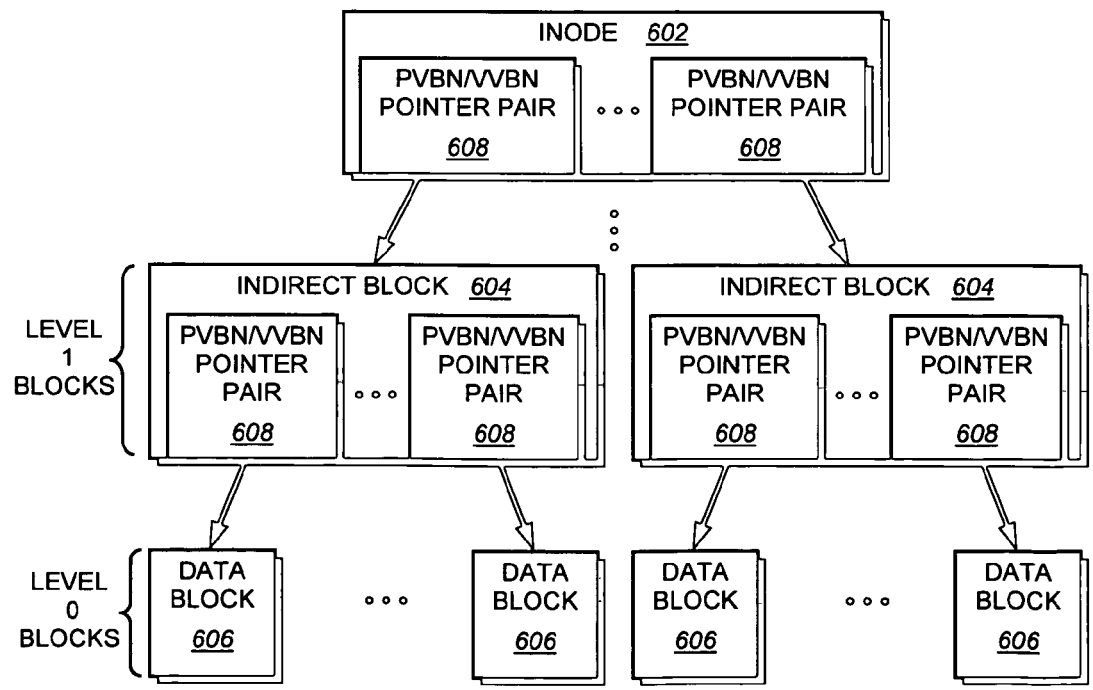
FIG. 6 is a schematic block diagram of an exemplary buffer tree in accordance with an embodiment of the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 6 is a schematic block diagram of an illustrative embodiment of a buffer tree of a file 600 that may be advantageously used with the present invention. A root (top-level) inode 602, such as an embedded inode, references indirect (e.g., level 1) blocks 604. Note that there may be additional levels of indirect blocks (e.g., level 2, level 3) depending upon the size of the file. The indirect blocks (and inode) contain pvbn/vvbn pointer pair structures 608 that ultimately reference data blocks 606 used to store the actual data of the file.

The pvbns reference locations on disks of the aggregate, whereas the vvbns reference locations within files of the flexible volume. The use of pvbns as block pointers 608 in the indirect blocks 604 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 7:
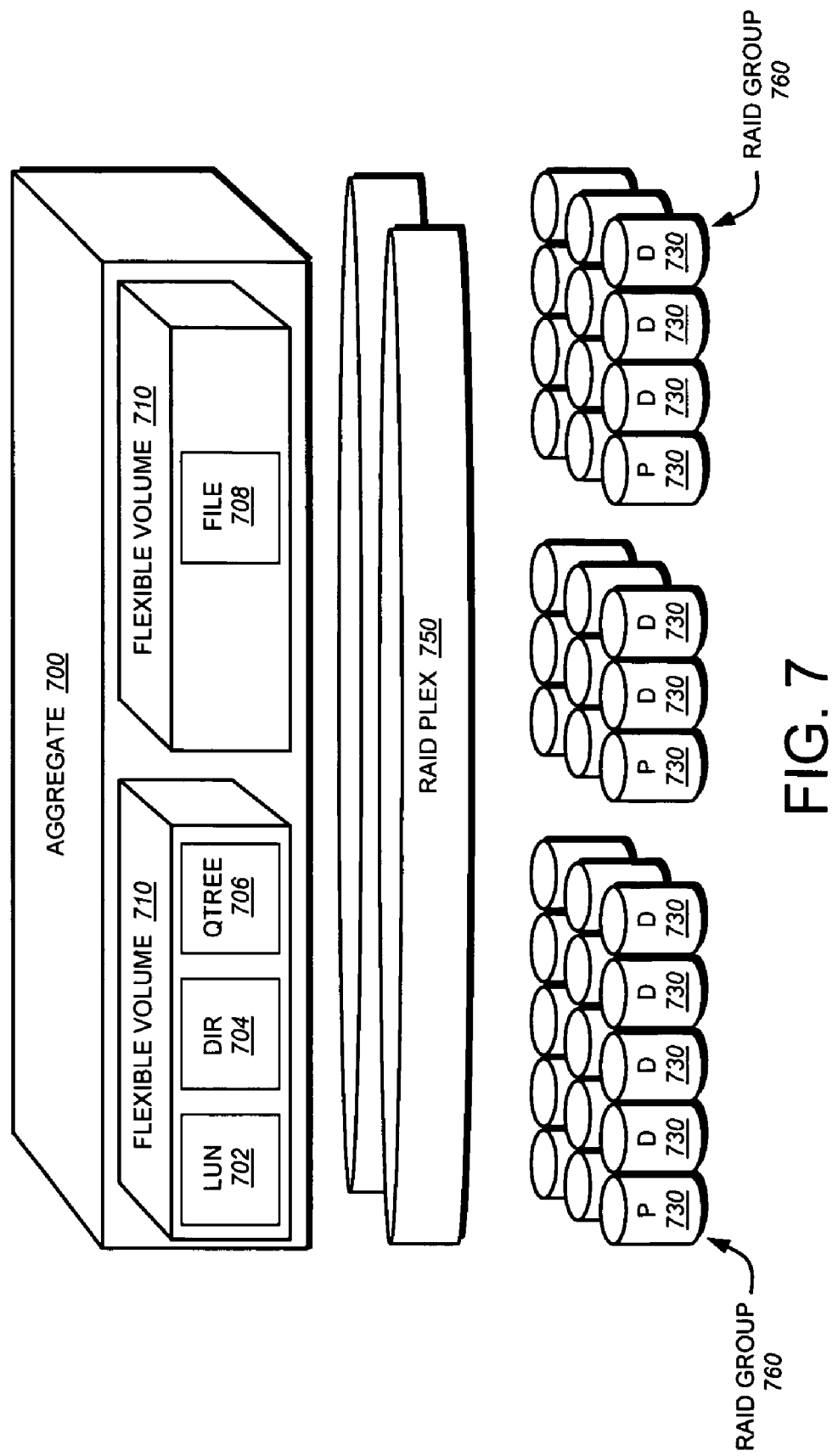
FIG. 7 is a schematic block diagram of an aggregate in accordance with an embodiment of the present invention.

FIG. 7 is a schematic block diagram of an embodiment of an aggregate 700 that may be advantageously used with the present invention. Luns (blocks) 702, directories 704, qtrees 706 and files 708 may be contained within flexible volumes 710, such as dual vbn flexible volumes, that, in turn, are contained within the aggregate 700. The aggregate 700 is illustratively layered on top of the RAID system, which is represented by at least one RAID plex 750 (depending upon whether the storage configuration is mirrored), wherein each plex 750 comprises at least one RAID group 760. Each RAID group further comprises a plurality of disks 730, e.g., one or more data (D) disks and at least one (P) parity disk.

Whereas the aggregate 700 is analogous to a physical volume of a conventional storage system, a flexible volume is analogous to a file within that physical volume. That is, the aggregate 700 may include one or more files, wherein each file contains a flexible volume 710 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 710 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 8:
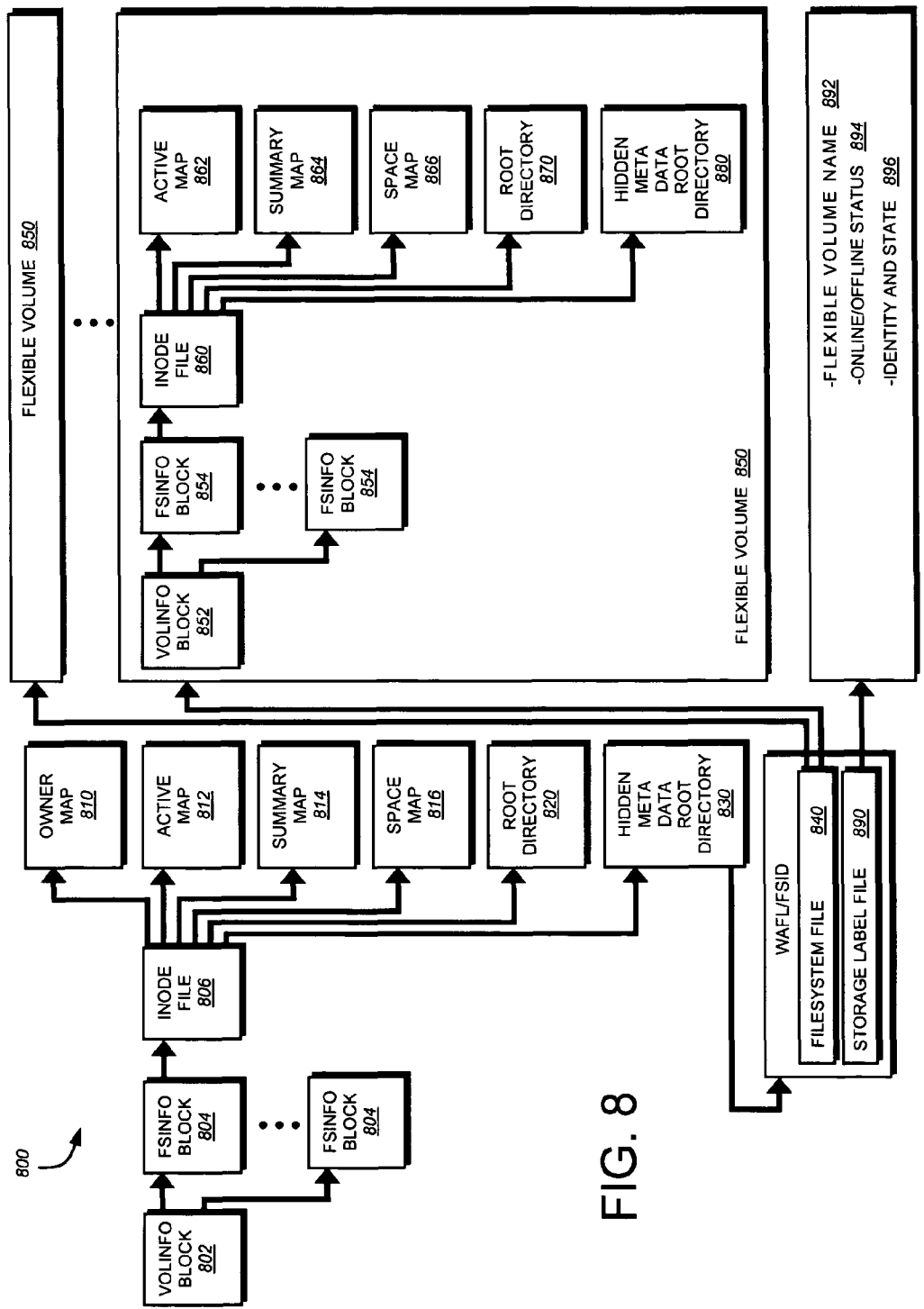
FIG. 8 is a schematic block diagram of an on-disk structure of an aggregate and flexible volume in accordance with an embodiment of the present invention.

FIG. 8 is a schematic block diagram of an on-disk representation of an aggregate 800. The storage operating system 300, e.g., the RAID system 340, assembles a physical volume of pvbns to create the aggregate 800, with pvbns 1 and 2 comprising a "physical" volinfo block 802 for the aggregate. The volinfo block 802 contains block pointers to fsinfo blocks 804, each of which may represent a snapshot of the aggregate. Each fsinfo block 804 includes a block pointer to an inode file 806 that contains inodes of a plurality of files, including an owner map 810, an active map 812, a summary map 814 and a space map 816, as well as other special meta-data files. The inode file 806 further includes a root directory 820 and a "hidden" meta-data root directory 830, the latter of which includes a namespace having files related to a flexible volume in which users cannot "see" the files. The hidden meta-data root directory includes the WAFL/fsid/directory structure that contains filesystem file 840 and storage label file 890. Note that root directory 820 in the aggregate is empty; all files related to the aggregate are organized within the hidden meta-data root directory 830.

In addition to being embodied as a container file having level 1 blocks organized as a container map, the filesystem file 840 includes block pointers that reference various file systems embodied as flexible volumes 850. The aggregate 800 maintains these flexible volumes 850 at special reserved inode numbers. Each flexible volume 850 also has special reserved inode numbers within its flexible volume space that are used for, among other things, the block allocation bitmap structures. As noted, the block allocation bitmap structures, e.g., active map 862, summary map 864 and space map 866, are located in each flexible volume.

Specifically, each flexible volume 850 has the same inode file structure/content as the aggregate, with the exception that there is no owner map and no WAFL/fsid/filesystem file, storage label file directory structure in a hidden meta-data root directory 880. To that end, each flexible volume 850 has a volinfo block 852 that points to one or more fsinfo blocks 854, each of which may represent a snapshot, along with the active file system of the flexible volume. Each fsinfo block, in turn, points to an inode file 860 that, as noted, has the same inode structure/content as the aggregate with the exceptions noted above. Each flexible volume 850 has its own inode file 860 and distinct inode space with corresponding inode numbers, as well as its own root (fsid) directory 870 and subdirectories of files that can be exported separately from other flexible volumes.

The storage label file 890 contained within the hidden meta-data root directory 830 of the aggregate is a small file that functions as an analog to a conventional raid label. A raid label includes physical information about the storage system, such as the volume name; that information is loaded into the storage label file 890. Illustratively, the storage label file 890 includes the name 892 of the associated flexible volume 850, the online/offline status 894 of the flexible volume, and other identity and state information 896 of the associated flexible volume (whether it is in the process of being created or destroyed).

F. Thin Provisioning of Data Containers

Certain file systems, including the exemplary WAFL file system include the capability to generate a thinly provisioned data container, wherein the data container is not completely written to disk at the time of its creation. As used herein, the term data container generally refers to a unit of storage for holding data, such as a file system, disk file, volume or a LUN, which is addressable by, e.g., its own unique identification. The storage space required to hold the contents of the thinly provisioned data container on disk has not yet been used. The use of thinly provisioned data container is often utilized in the exemplary file system environment when, for example, a vdisk is initially generated. A user or administrator may generate a vdisk of specified size, for example, 10 gigabytes (GB), which size represents the maximum addressable space of the vdisk. To increase system performance, the file system generally does not write the entire vdisk contents to the disks at the time of creation. Instead, the file system generates a thinly provisioned data container (i.e., file) representing the vdisk. The thinly provisioned data container may then be populated (filled in) via subsequent write operations as the vdisk is filled in with data. While this description is written in terms of a thinly provisioned data container disposed over an underlying file system, it should be noted that other thin provisioning implementations may be utilized. As such, the use of an underlying file system to support a thinly provisioned data container should be taken as exemplary only.

Figure 9:
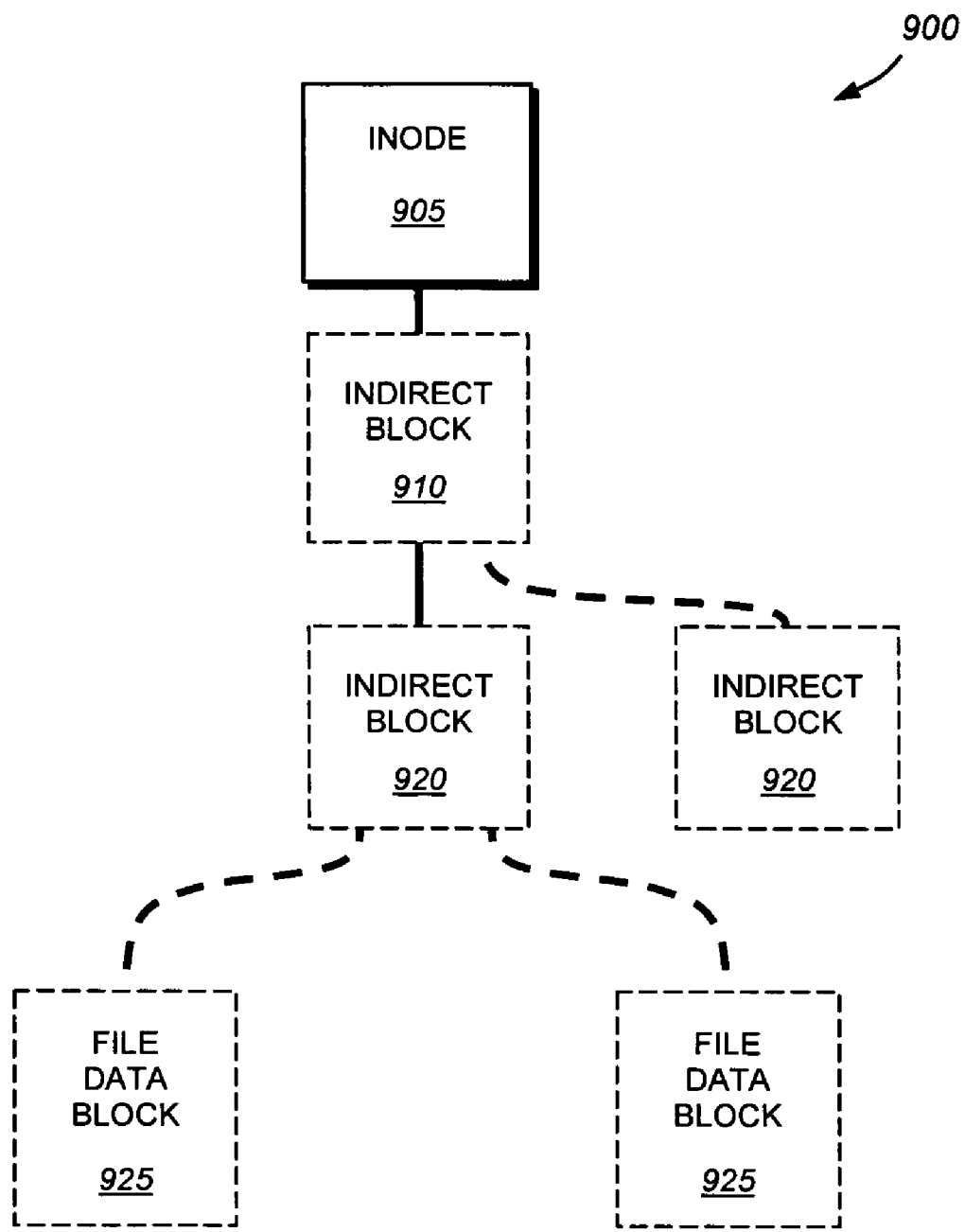
FIG. 9 is a schematic block diagram of an exemplary thinly provisioned data container in accordance with an embodiment of the present invention.

FIG. 9 is a schematic block diagram of an inode structure, i.e., a buffer tree 900, of an exemplary thinly provisioned data container. The (inode) buffer tree structure 900 is created when, for example, a vdisk is first created by the file system as thinly provisioned. In a typical thinly provisioned data container, only the inode 905 is actually written to disk. The remainder of the data container is not written to or otherwise physically stored on the disk(s) storing the data container. Although, the data container 900 includes a completed inode 905, it does not contain indirect blocks 910, 920 or file data blocks 925 (as shown in phantom). Thus, these phantom blocks (i.e., 910, 920, 925) are not generated when the data container is created, although, they will be written to disk as the data container is populated. By only writing the inode to disk when a thinly provisioned data container is generated, substantial time is saved as the number of disk accesses is reduced. Additionally, only the storage space on the disks that is needed to hold the contents of the data container is utilized.

Illustratively, the file system makes appropriate space reservations to ensure that the entire thinly provisioned data container may be written to disk. Space reservation techniques are described in U.S. Pat. No. 7,577,692, issued on Aug. 18, 2009, entitled SYSTEM AND METHOD FOR RESERVING SPACE TO GUARANTEE FILE WRITABILITY IN A FILE SYSTEM SUPPORTING PERSISTENT CONSISTENCY POINT IMAGES, by Peter F. Corbett, et al.

Figure 10:
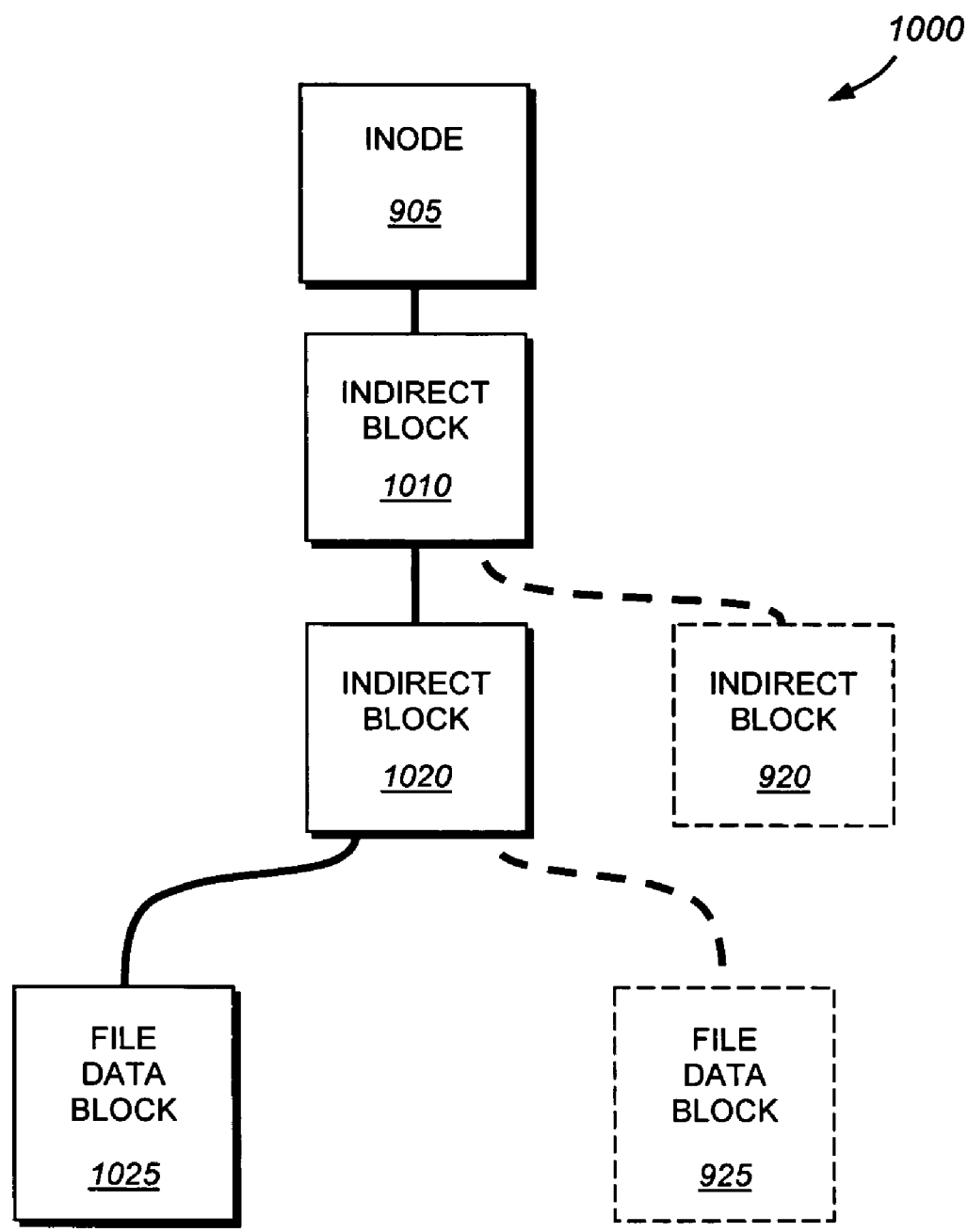
FIG. 10 is a schematic block diagram of an exemplary thinly provisioned data container after a first write operation in accordance with embodiment of the present invention.
Figure 11:
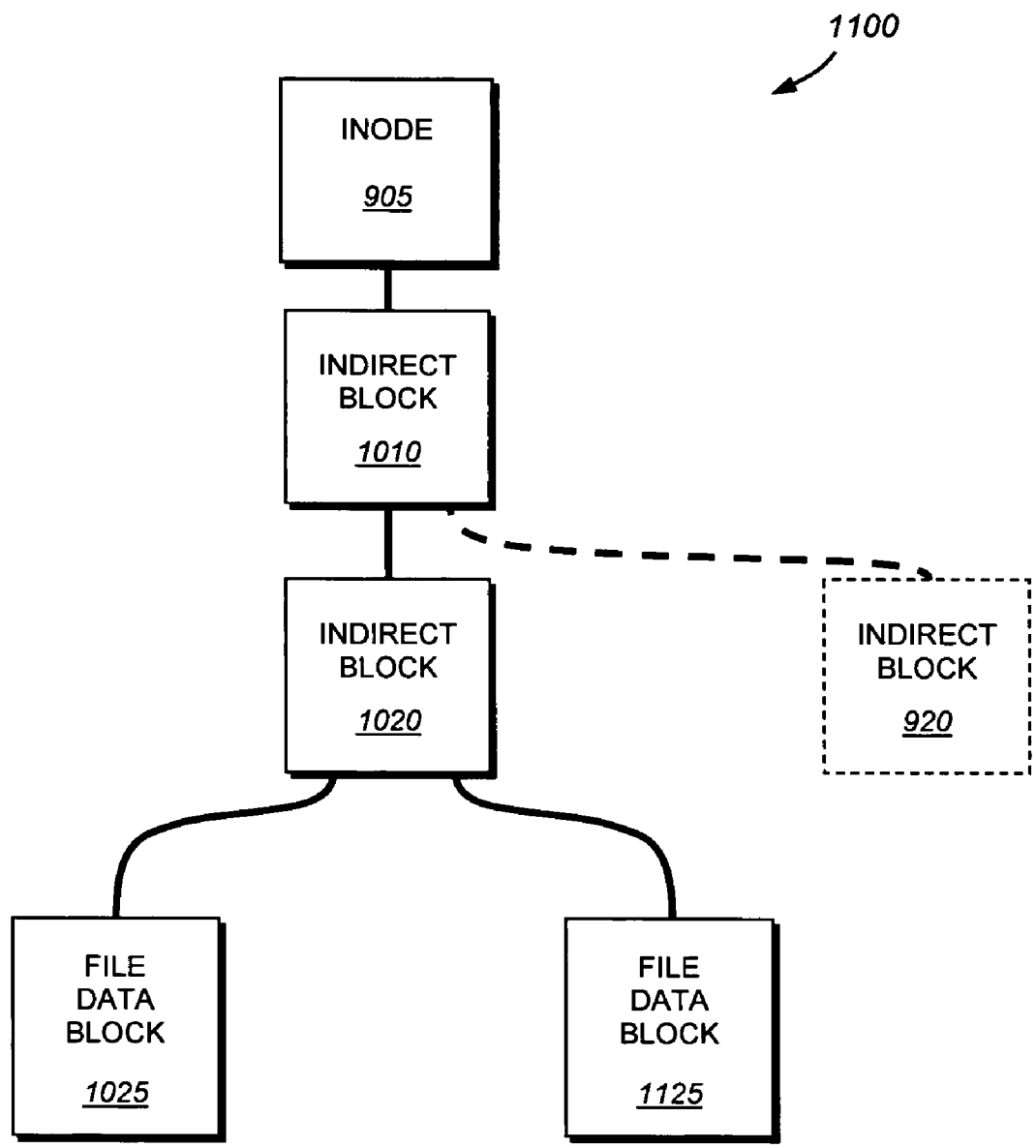
FIG. 11 is a schematic block diagram of an exemplary thinly provisioned data container after a second write operation in accordance with and bought in the present invention.
Figure 12:
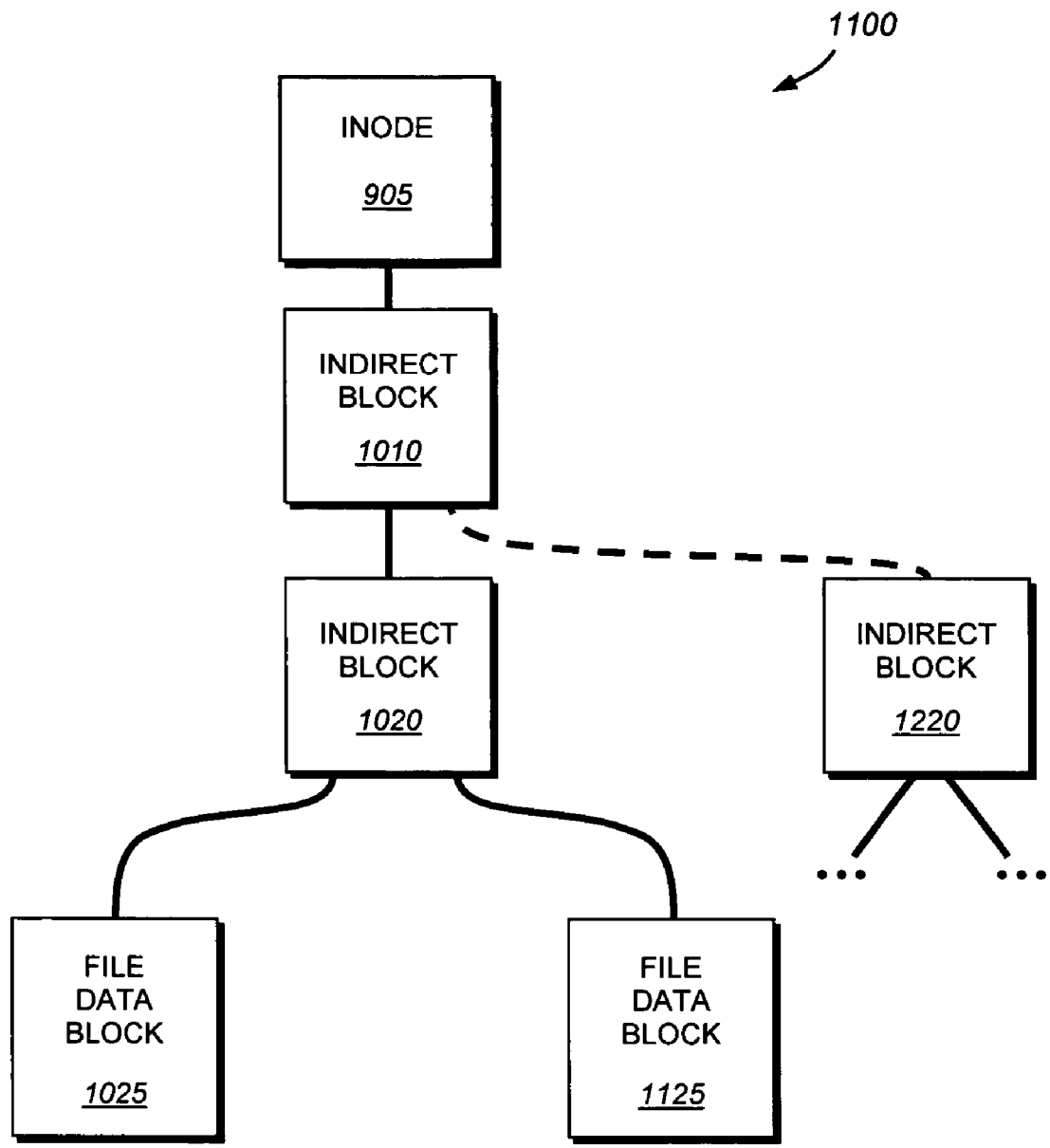
FIG. 12 is a schematic block diagram of an exemplary thinly provisioned data container after it has been fully written in accordance with an embodiment of the present invention.

FIG. 10 is a schematic block diagram of an exemplary (inode) buffer tree structure 1000 of a partially filled in thinly provisioned data container that includes original inode 905. Here, indirect blocks 1010, 1020 and exemplary file data block 1025 have been populated (filled in) in response to one or more write operations to the data container. Continued write operations results in filling in additional data blocks, for example, file data block 1125 as shown in the exemplary (inode) buffer tree structure 1100 of FIG. 11. Eventually, when the data container has been completely filled, all blocks, including such blocks as indirect blocks 1220 and associated file data blocks (not shown) will be completed as illustrated in the schematic block diagram of an exemplary inode structure 1200 in FIG. 12. At such time, the thinly provisioned data container has been completely filled in and each block is associated with an actual block on disk.

G. Storage Groups and Storage Pools

In accordance with an illustrative embodiment of the present invention, the FSM organizes storage, such as aggregates, into a series of logical constructs called storage groups located on a single storage system. Each storage group is associated with a particular class of storage device, such as 15,000 rpm disks or serial ATA attached disks. The FSM also associates storage groups having the same characteristics across multiple storage systems into logical constructs called storage pools. Thus a particular storage pool may identify all storage space within a storage system environment associated with a particular class of storage device. Notably, the storage pool logically decouples (abstract) the storage systems from the users. Similarly, the storage groups abstract the various aggregates (or other storage entities) from the storage devices. The FSM utilizes the storage groups and storage pools to present a unified view of storage to clients. Through management of storage groups and/or pools, the FSM may increase the utilization rate of storage and thereby reduce the amount of wasted storage space. This reduction of wasted and underutilized storage improves the return on investment of the storage system environment.

Figure 13:
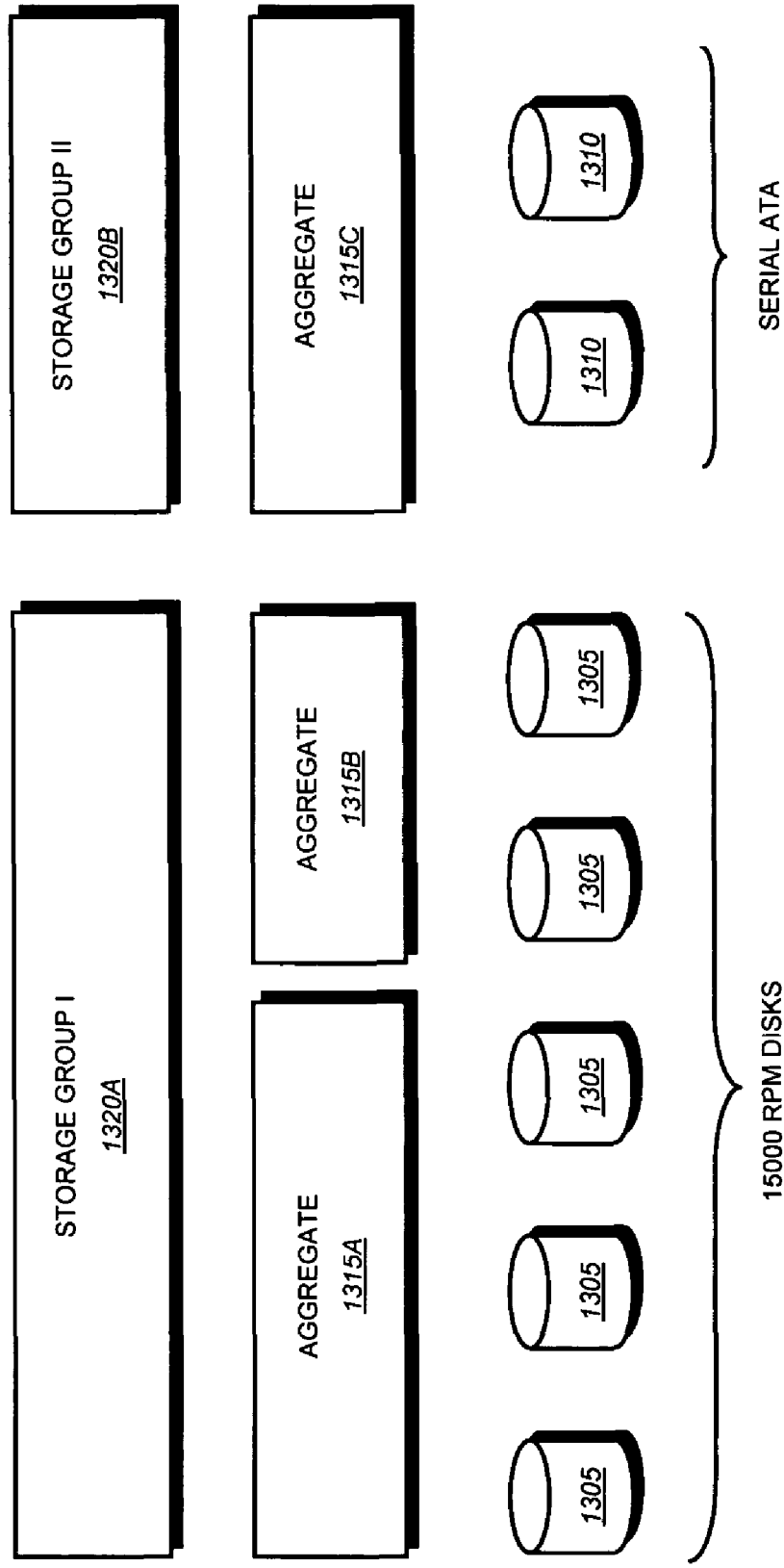
FIG. 13 is a schematic block diagram showing the assignment of sets of similarly storage devices having the same performance characteristics to storage groups in accordance with an embodiment of the present invention.

FIG. 13 is a schematic block diagram showing the organization of aggregates into storage groups in accordance with an embodiment of the present invention. Illustratively a first set of disks 1305 are 15,000 rpm disks and organized into two aggregates 1315 A, B, which are further organized into a first storage group 1320A. A second set of disks 1310, which may be a set of serial ATA disks, are organized into aggregate 1315C, which is further associated with a second storage group 1320B. Thus, the FSM may associate high speed storage with storage group 1320A and slower speed storage with storage group 1320B. By associating storage devices into storage groups based on a type of device, the FSM enables additional functionality, such as providing level of service guarantees. Utilization of storage groups and storage pools for improved storage functionality is described in U.S. Publication No. 2007/0233868, published Oct. 4, 2007, entitled SYSTEM AND METHOD FOR QUALITY OF SERVICE, by John Tyrrell.

Figure 14:
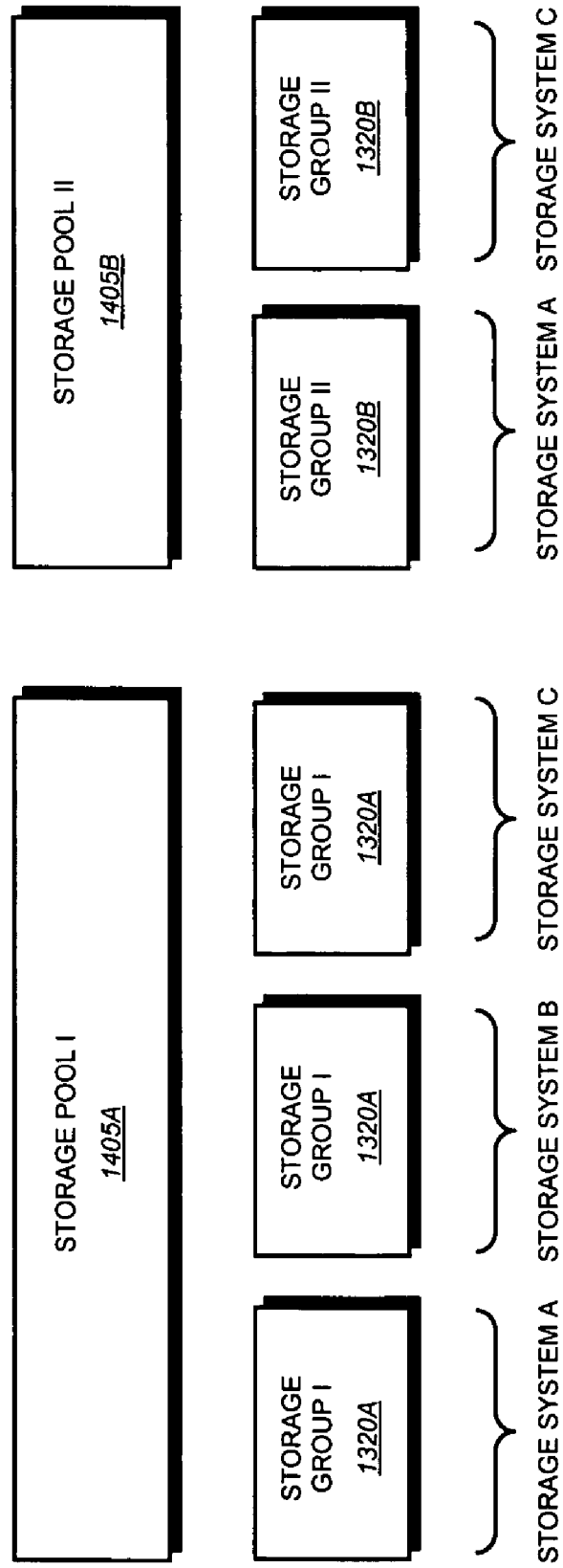
FIG. 14 is a schematic block diagram showing the assignment of storage groups having the same performance characteristics from a plurality of storage systems to storage pools in accordance with an embodiment of the present invention.

FIG. 14 is a schematic block diagram showing the organization of storage groups into storage pools in accordance with an embodiment of the present invention. A first storage pool 1405A is logically associated with a plurality of storage groups 1320A, which may be serviced by a plurality of storage systems, such as storage system A, B, C. Similarly, a second storage pool 1405 B is associated with a plurality of storage groups 1320 B which may be serviced by a plurality of storage systems A, C. By utilizing storage groups and storage pools the FSM may serve to abstract the underlying storage mechanisms and generate a unified view of the storage space across all storage systems of a storage system environment. Thus, from a user's perspective, storage pool 1405A presents a view of storage that permits a user and/or storage administrator to ignore the underlying details, such as storage groups, aggregates, and/or physical storage systems. This unified view enables ease of management on the storage administrator's part.

In the illustrative embodiment, the FSM queries each storage system for information regarding each of the aggregates served by the storage system. The FSM collects this information to enable construction of storage groups and storage pools. Illustratively, the information is obtained via remote procedure calls (RPCs) to each of the storage systems by the FSM. The FSM stores the current storage group/pool assignments in configuration table 131.

Figure 15:
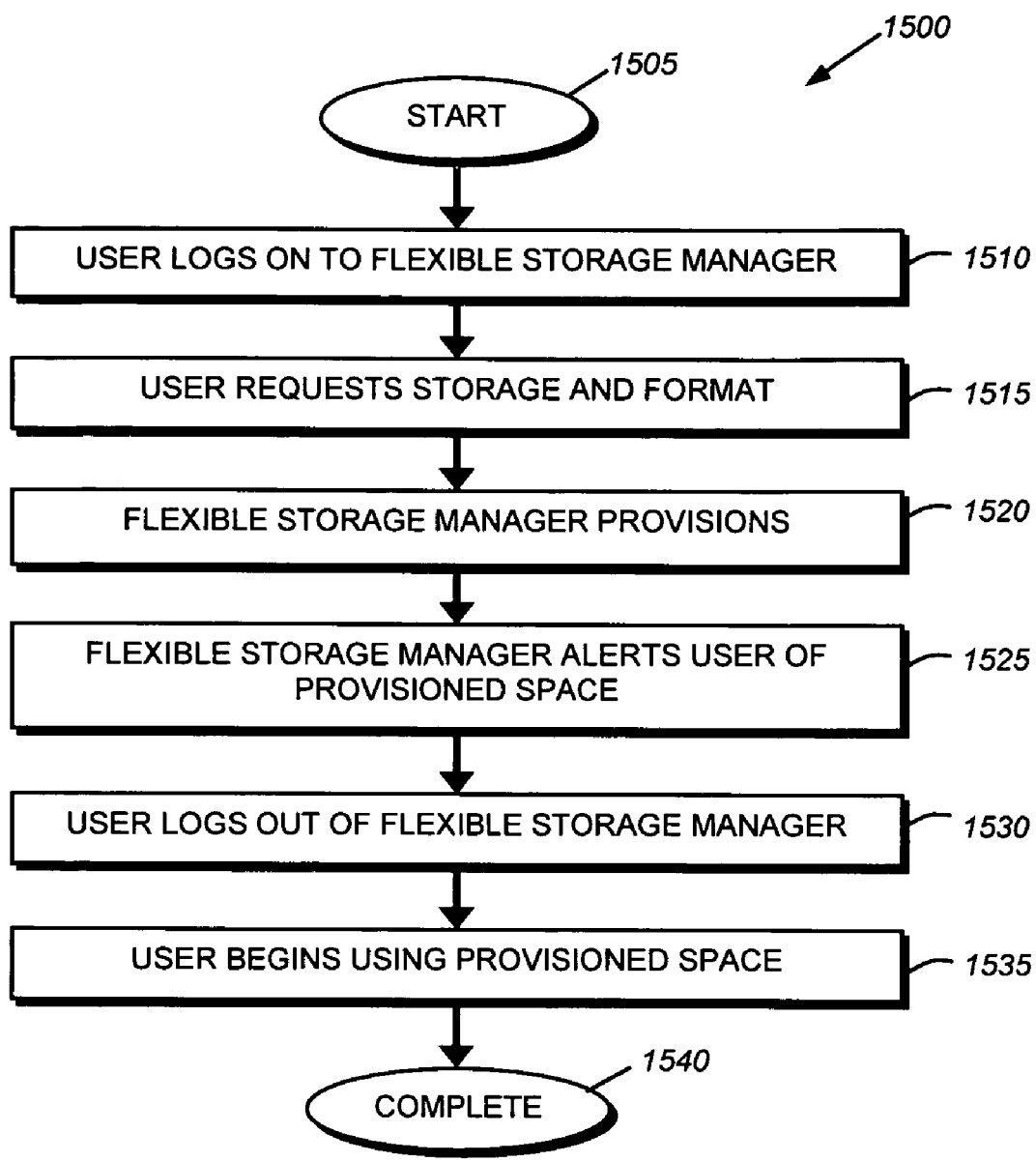
FIG. 15 is a flowchart detailing the steps of an exemplary procedure for provisioning data in accordance with an embodiment of the present invention.

FIG. 15 is a flowchart detailing the steps of a procedure for provisioning storage in accordance with an embodiment of the present invention. The procedure 1500 begins in step 1505 and continues to step 1510 where a user logs into the FSM. The user then requests appropriate storage space and a format of storage that he desires, e.g., a LUN or an NFS share in step 1515. The user may identify a desired size of storage; however, in the illustrative embodiment, all storage is thinly provisioned, as described above, which results in the FSM being able to allocate space on any appropriate storage pool and, consequently on any available storage system. Once the user has requested the storage, the FSM provisions the storage in step 1520. This provision process may include, for example, the creation of a flexible volume within an aggregate associated with a storage group and storage pool. In the illustrative embodiment, the FSM provisions storage on a first available storage pool or storage group. Moreover, provisioning illustratively occurs on a round robin basis among the storage pools by e.g., the FSM sending appropriate RPCs to the storage system to perform the necessary steps for creating and exporting a LUN. Creation and exporting of storage (such as a LUN) is further described in U.S. Pat. No. 7,055,014, issued May 30, 2006, entitled USER INTERFACE SYSTEM FOR A MULTI-PROTOCOL STORAGE APPLIANCE, by Brian Pawlowski, et al, the contents of which are hereby incorporated by reference. Once provisioning is complete, the FSM alerts the user of the provisioned space in step 1525 via, e.g., a display in the GUI or the user's console. Illustratively, the alert includes information such as the pathname of the storage and other logical naming information required for the client to access the storage. The user then logs out of the FSM in step 1530 and begins using the provisioned storage space in step 1535. The procedure completes in step 1540.

Advantageously, the FSM enables rapid and easy provisioning of storage without storage administrator interaction. By organizing the storage into storage groups and/or storage pools, the FSM may easily identify the storage to be utilized. As all of the data containers are generated using thin provisioning, the need for storage administrator interaction to determine appropriate extents is obviated.

Figure 16:
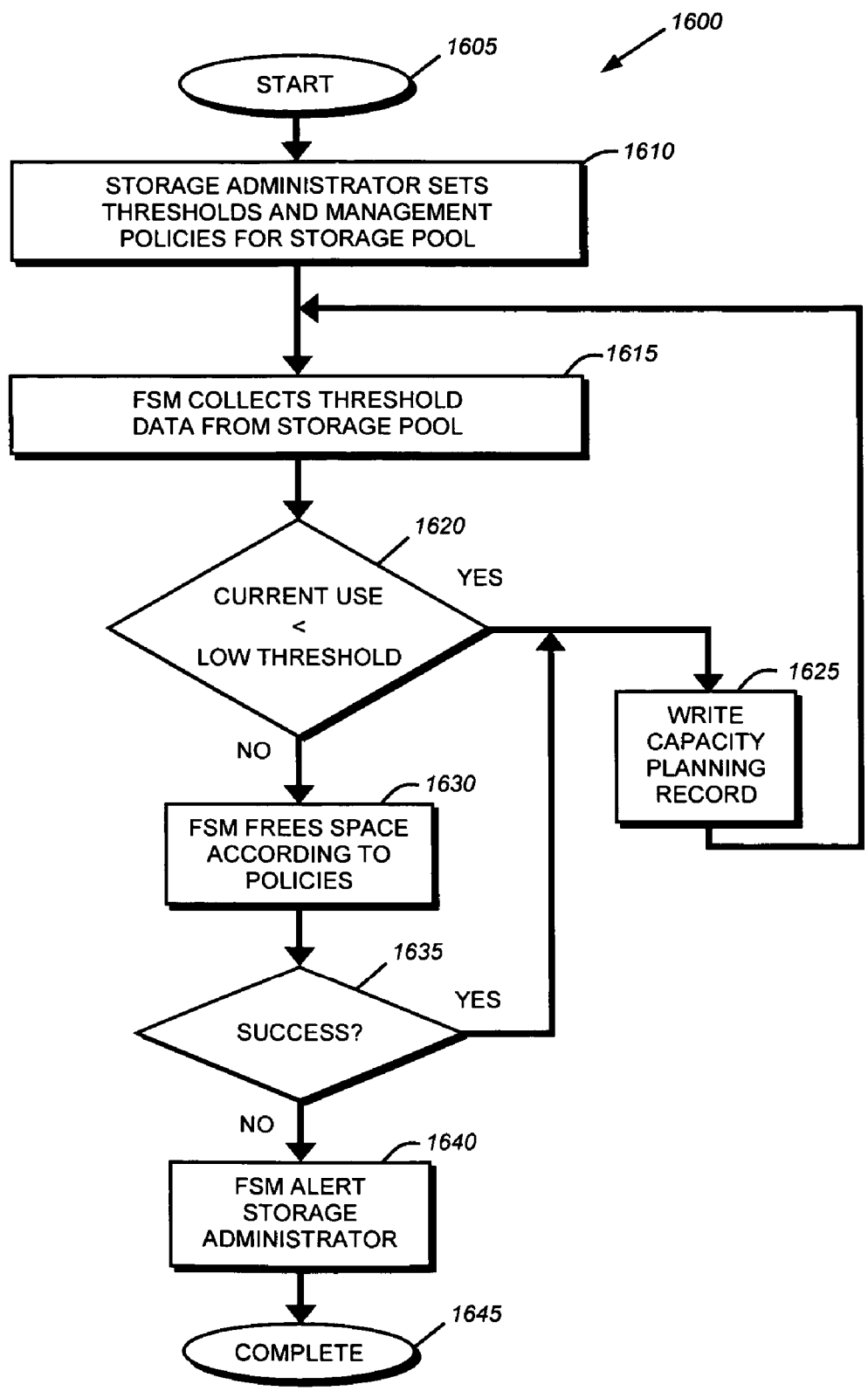
FIG. 16 is a flowchart detailing the steps of a procedure for performing low threshold controlled monitoring in accordance with an embodiment of the present invention.

FIG. 16 is a flowchart detailing the steps of a procedure 1600 for performing capacity threshold monitoring in accordance with an embodiment of the present invention. The procedure 1600 begins in step 1605 and continues to step

1610 where a storage administrator sets a threshold value and a set of management policies for a storage pool. For example, a threshold value may be set at 80% of the total capacity, however, each storage administrator may set the threshold value according to their desired storage system configuration. It should be noted that in the illustrative embodiment, threshold capacity management is performed on storage pool basis. However, it should be noted that in alternate embodiments, capacity threshold monitoring may be performed on a storage group and/or other storage object level. By utilizing storage pool capacity planning, the FSM may migrate the data from one storage system to another within the storage pool to thereby enable load balancing. In step 1615, the FSM collects threshold data from the storage pool illustratively, by, for example, retrieving usage and utilization data from each of the storage systems in the storage pool. This utilization data may be retrieved using, for example, a remote procedure call (RPC) to each storage system to retrieve the data. In alternate embodiments, the FSM may utilize other techniques for retrieving the utilization data including, for example, reading appropriate metadata files stored by the storage systems within the storage pool. Illustratively, the FSM collects the threshold data on a predetermined period which is set by the storage administrator on the basis of possibility for data growth. For example, the FSM may initially collect threshold data on a daily, hourly, etc. basis. However, for storage pools of high data growth, the periodicity may be smaller to enable better management. Similarly, in storage pools having a slow data growth, a larger periodicity may be utilized.

Once threshold data has been collected, the FSM determines whether the current use is less than the threshold value in step 1620. If the current use is less than the threshold value, the procedure branches to step 1625 where the FSM writes a capacity planning record and the procedure loops back to step 1615. The FSM writes a capacity planning record to be utilized at a later point in time for actual data growth analysis. Illustratively, the capacity planning record is written to local storage of the FSM. However, in alternate embodiments, the capacity planning record may be written to the storage pool itself.

However, if in step 1620, the current use is not less than the threshold value, then the procedure continues to step 1630 where the FSM attempts to free space according to the management policies previously set by the storage administrator. These policies may include, for example, the deletion of PCPIs older than a certain date, the migration of least recently used data from the storage pool to another storage pool, etc. The FSM attempts to free space so that the current use is at the threshold value. Illustratively, the FSM only reduces the free space to the threshold value even if the free space can be reduced further below the threshold value. A determination is made in step 1635 whether the FSM was successful in freeing space so that the current utilization is at the threshold value. If successful, the procedure branches to step 1625 and the FSM writes a capacity planning record identifying the amount of space freed to obtain the low threshold value. The capacity planning record may be utilized then to identify the actual rate of data growth in accordance with an embodiment of the present invention. However, if the operation is not successful, the procedure continues to step 1640 were the FSM issues an alert to the storage administrator before continuing on to complete in step 1645. In response to receiving such an alert, a storage administrator may perform appropriate actions to remediate the inability to meet the low threshold. For example, the low threshold may be set at an unrealistic level and should be raised. Alternately, the storage administrator may add additional storage and/or begin migrating data earlier than what is required by the management policies.

Figure 17:
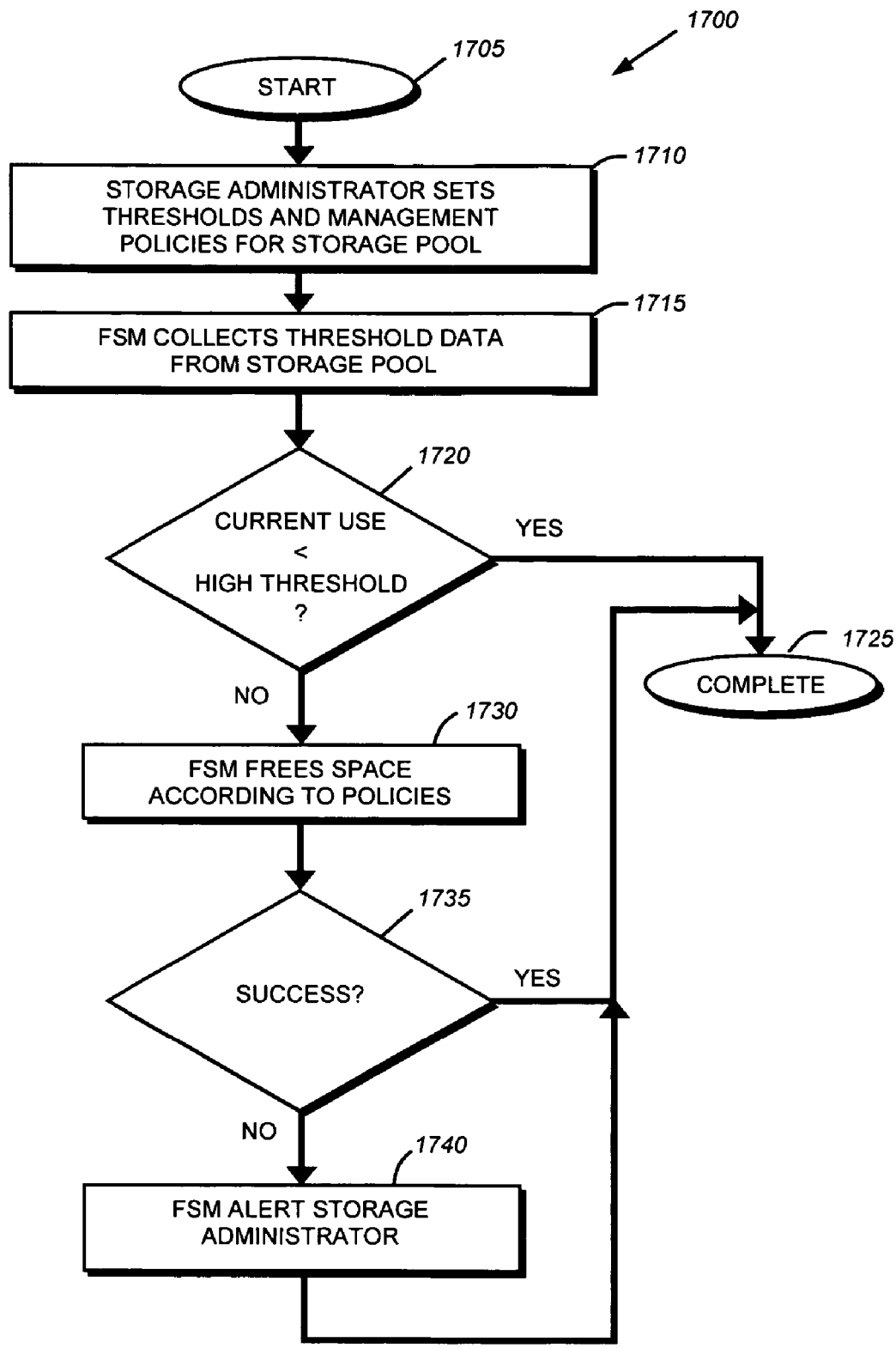
FIG. 17 is a flowchart detailing the steps of a procedure for performing high threshold controlled monitoring in accordance with an embodiment of the present invention.

FIG. 17 is a flowchart detailing the steps of a procedure 1700 for performing capacity threshold monitoring in accordance with an embodiment of the present invention. The procedure 1700 begins in step 1705 and continues to step 1710 where a storage administrator sets a high threshold and a set of management policies for a storage pool. As noted above in reference to FIG. 16, these policies are illustratively set on a storage pool basis. In step 1715, the FSM collects high threshold data from the storage pool illustratively, by, for example, retrieving usage and utilization data from each of the storage systems in the storage pool. Illustratively, the FSM collects the high threshold data on a predetermined period which is set by the storage administrator on the basis of possibility for data growth. Illustratively, the check for high threshold utilization occurs more frequently than the check for low threshold (procedure 1600). For example, procedure 1600 (checking on low threshold) may be performed every four hours, while procedure 1700 (checking for high threshold) may be performed hourly. Once the threshold data has been collected, the FSM determines whether the current use is less than the high threshold value in step 1720. If the current use is less than the high threshold value, the procedure branches to step 1725 and completes. Illustratively, no capacity planning record is written when monitoring high threshold values.

However, if in step 1720, the current use is not less than the high threshold value, then the procedure continues to step 1730 where the FSM attempts to free space according to the management policies previously set by the storage administrator. The FSM attempts to free space so that the current use is reduced below the high threshold value.

Figure 18:
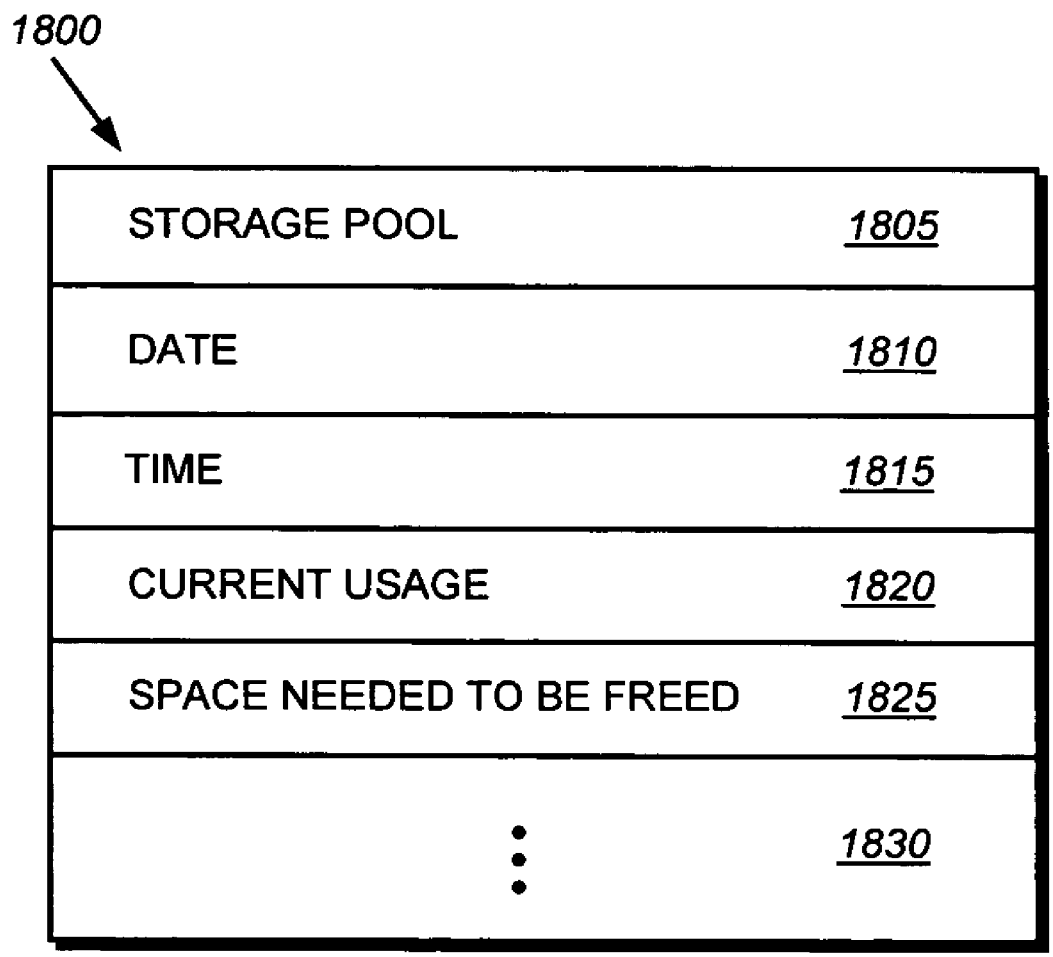
FIG. 18 is a schematic block diagram of an exemplary capacity planning record in accordance with an embodiment of the present invention.

A determination is made in step 1735 whether the FSM was successful in freeing space so that the current utilization is below the high threshold value. If successful, the procedure branches to step 1725 and completes. However, if the operation is not successful, the procedure continues to step 1740 were the FSM issues an alert to the storage administrator before continuing on to complete in step 1625. In response to receiving such an alert, a storage administrator may perform appropriate actions to remediate the inability to meet the high threshold FIG. 18 is a schematic block diagram of an exemplary capacity planning record 1700 in accordance with an embodiment of the present invention. The capacity planning record includes a storage pool field 1805, a date field 1810, a time field 1815, a current usage field 1820, a space freed 1820 and, in alternate embodiments, additional fields 1830. The storage pool field 1805 contains an identifier that identifies the storage pool for which the capacity planning record is associated. The date and time fields 1810, 1815 identify the date/time at which this capacity planning record was written. The current usage field 1820 identifies the current space utilized within the storage pool. The space freed field 1825 identifies the amount of space, if any, that was needed to be freed to lower the usage to the threshold value that was previously set.

In accordance with an illustrative embodiment of the present invention, the FSM creates capacity planning records at various times to store data associated with actual data growth. Since, data containers stored within the storage pools are thinly provisioning, the amount of space currently utilized within a storage pool reflects true storage utilization. This is unlike previous systems where significant amounts of space storage space where provisioned for various data containers but not utilized by users.

Figure 19:
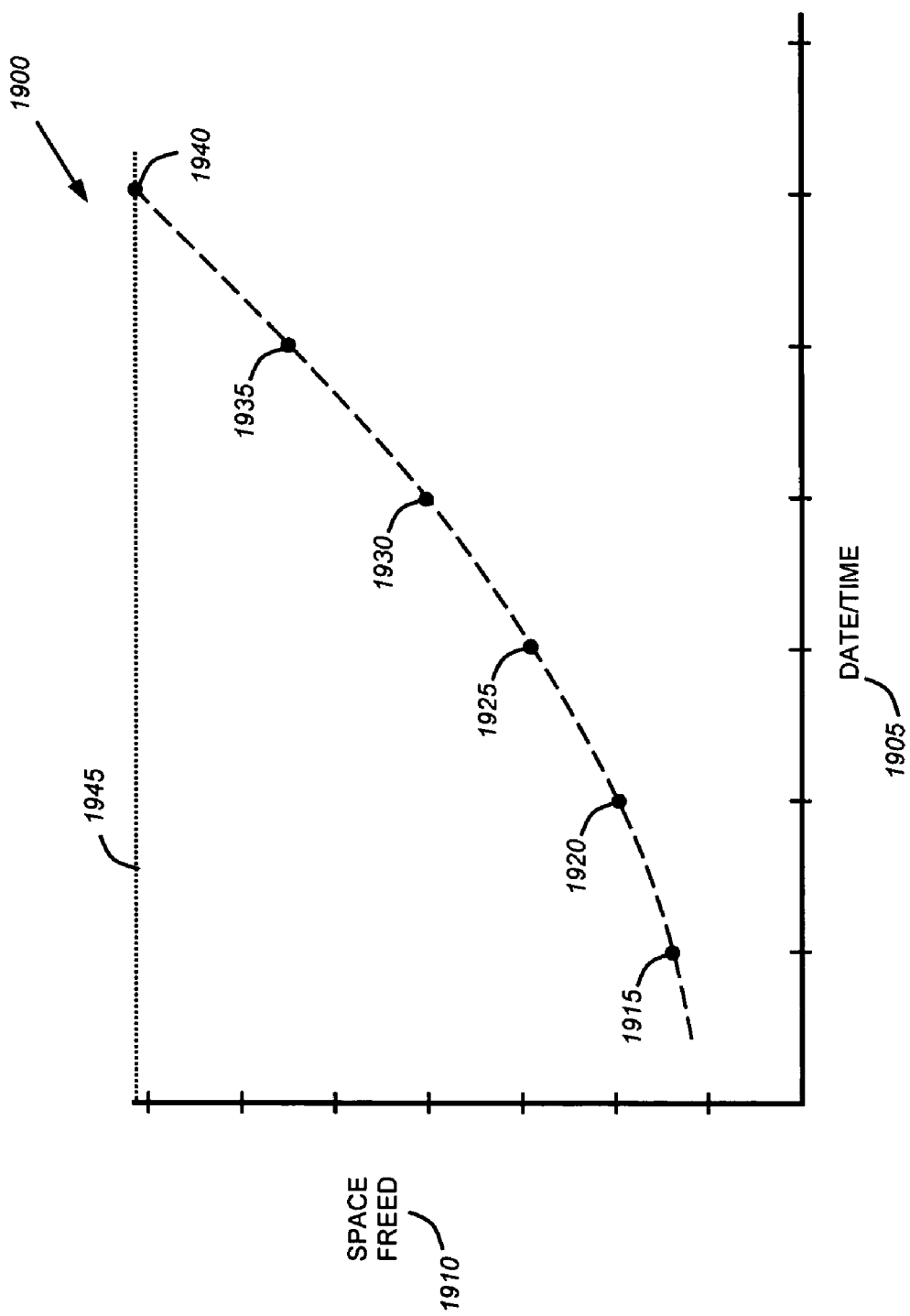
FIG. 19 is a schematic diagram showing a actual data growth rate obtainable using capacity planning records in accordance with an embodiment of the present invention.

The capacity planning records may be analyzed by the FSM to generate a graph of actual data growth. FIG. 19 is any exemplary graph 1900 that may be generated by the FSM using data stored in capacity planning records 1800. Illustratively the graph 1900 has date/time as the X-axis 1905 and the space needed to be freed 1910 as the Y-axis. The space needed to be freed 1910 identifies the space needed to be freed to lower the utilization to the threshold for a particular storage pool. A series of points 1915, 1920, 1925, 1930, 1935 and 1940 illustratively identify six data points gathered and stored in the capacity planning records. The FSM may then graph the rate of actual data growth by drawing a line through the data points using conventional point fitting algorithms. Thus, for example if data point 1940 had yet to be collected, but the storage administrator was interested in determining when the space utilized will exceed a certain threshold level 1945, the FSM may, by fitting a curve to previous data points, determine the point of intersection 1940.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for implementing storage management of a plurality of storage pools associated with one or more storage systems, each respective storage pool including a plurality of storage devices, the method executing on a processor comprising:
   in response to a storage request, provisioning a storage space from at least one of the plurality of storage pools;
   retrieving a current utilization data from each storage pool;
   determining if the current utilization data from a first storage pool exceeds a threshold capacity;
   in the event that the current utilization data exceeds the threshold capacity, freeing space in the first pool according to one or more storage management policies, and storing a capacity planning record of a plurality of capacity planning records to track actual data growth in each storage pool, wherein the capacity planning record includes a current usage field and a space needed to be freed field;
   collecting a set of data points from the plurality of capacity planning records;
   fitting a curve to the set of data points; and
   determining a point of intersection of the curve to a capacity level when actual data growth exceeds the capacity level.

2. The method of claim 1 further comprising:
   in the event that the current utilization data does not exceed the threshold capacity, storing a capacity planning record to track actual data growth in each storage pool, wherein the capacity planning record includes a current usage field and a space needed to be freed field.

3. The method of claim 1 wherein freeing space in the first storage pool further comprises:
   freeing only an amount of space to reduce the current utilization data to approximately the threshold capacity.

4. The method of claim 1 further comprising:
   querying the first storage pool via a remote procedure call to retrieve the current utilization data for the first storage pool.

5. The method of claim 1 wherein provisioning the storage space further comprises:
   thinly provisioning a data container, wherein the data container is not completely written to disk at the time of creation.

6. The method of claim 1 wherein retrieving the current utilization data from each storage pool is performed at regular intervals.

7. The method of claim 1 further comprising:
   determining a rate of actual data growth using the space needed to be freed field of one or more of the plurality of capacity planning records.

8. A system configured to implement storage management of a plurality of storage pools associated with one or more storage systems, each respective storage pool including a plurality of storage devices, comprising:
   a computer having a storage manager configured to allocate and analyze storage space over the one or more storage systems;
   means for provisioning a storage space from at least one of the plurality of storage pools in response to a storage request;
   means for retrieving a current utilization data from each storage pool;
   means for determining if the current utilization data from a first storage pool exceeds a threshold capacity;
   in the event that the current utilization data exceeds the threshold capacity, the storage manager configured to free space in the first storage pool according to one or more storage management policies, wherein the storage manager stores a capacity planning record of a plurality of capacity planning records to track actual data growth in each storage pool, and wherein the capacity planning record includes a current usage field and a space needed to be freed field;
   collecting a set of data points from the plurality of capacity planning record;
   fitting a curve to a set of data points; and
   determining a point of intersection of the curve to a capacity level when actual data growth exceeds the capacity level.

9. The system of claim 8 wherein:
   in the event that the current utilization data does not exceed the threshold capacity, the storage manager further configured to store a capacity planning record to track actual data growth in each storage pool, wherein the capacity planning record includes a current usage field and a space needed to be freed field.

10. The system of claim 8 wherein the storage manager is further configured to free only an amount of space to reduce the current utilization data to approximately the threshold capacity.

11. The system of claim 8 further comprising:
    means for querying one or more of the storage systems to retrieve the current utilization data for the first storage pool.

12. The system of claim 8 wherein means for provisioning the storage space further comprises:
    means for thinly provisioning a data container, wherein the data container is not completely written to disk at the time of creation.

13. A non-transitory computer readable medium containing executable program instructions executed by a processor, comprising:

program instructions that establish, by a storage manager, a plurality of storage pools associated with a plurality of storage systems, the plurality of storage pools comprising a plurality of storage devices, each storage pool comprising one or more storage groups of storage devices of the plurality of storage devices, each respective storage group of the storage devices having substantially identical performance characteristics across the plurality of storage systems;

program instructions that, by the storage manager, provision from at least one of the plurality of storage pools a storage space in response to a storage request;

program instructions that retrieve, by the storage manager, a current utilization data from each storage pool of the plurality of storage systems;

program instructions that, by the storage manager, determine if the current utilization data from a first storage pool exceeds a threshold capacity;

program instructions that, in the event that the current utilization data does exceed the threshold capacity, by the storage manager, free space in the first storage pool according to one or more storage management policies, wherein the storage manager stores a capacity planning record of a plurality of capacity planning records to track actual data growth in each storage pool, and wherein the capacity planning record includes a current usage field and a space needed to be freed field;

program instructions that collect a set of data points from the plurality of capacity planning records;

program instructions that fit a curve to the set of data points; and program instructions that determine a point of intersection of the curve to a capacity level when actual data growth exceeds the capacity level.

14. A computer system, comprising:

a processor configured to execute a storage manager;

a plurality of storage pools established by the storage manager, each storage pool associated with a plurality of storage systems, the plurality of storage pools comprising a plurality of storage devices, each storage pool comprising one or more storage groups of storage devices of the plurality of storage devices, each respective storage group of storage devices having substantially identical performance characteristics across the plurality of storage systems;

a storage space provisioned by the storage manager, from at least one of the plurality of storage pools;

a current utilization data retrieved by the storage manager, from each storage pool of the plurality of storage systems;

a determination by the storage manager, if the current utilization data from a first storage pool exceeds a threshold capacity, and in the event that the current utilization data does exceed the threshold capacity, the storage manager freeing space in the first storage pool according to one or more storage management policies, wherein the storage manager stores a capacity planning record of a plurality of capacity planning records to track actual data growth in each storage pool, and wherein the capacity planning record includes a current usage field and a space needed to be freed field;

a set of data points collected from the plurality of capacity planning records:

a capacity level determined from a point of intersection of a curve fitted to the set of data points when actual data growth exceeds the capacity level.

15. The system of claim 14 further comprising:

wherein the storage manager provisions the storage space using thin provisioning, wherein the data container is not completely written to disk at the time of creation.

16. A method, comprising:

assigning a plurality of storage devices to at least one storage group, wherein all of the storage devices in the at least one storage group have substantially identical performance characteristics;

assigning the at least one storage group to at least one storage pool, wherein the at least one storage group is selected from a plurality of storage groups, each of the plurality of storage groups associated with a storage system;

setting, through a user interface, a low threshold value and a high threshold value for each storage pool, wherein the low and high threshold values are for storage utilization;

obtaining, by a storage manager, a current utilization data representing a current usage from a selected storage pool of the at least one storage pool;

determining, by the storage manager, whether the current usage exceeds the low threshold value of the selected storage pool;

in response to a determination that the current usage does not exceed the low threshold value of the selected storage pool, writing, by the storage manager, a first capacity planning record of a plurality of capacity planning records, wherein the capacity planning record tracks actual data growth in each storage pool, and wherein the capacity planning record includes a current usage field and a space needed to be freed field;

in response to a determination that the current usage exceeds the low threshold value of the selected storage pool, attempting, by the storage manager, to free a storage space from the selected storage pool, and determining whether the storage manager was successful in freeing the storage space;

in response to a determination that the storage manager was successful in freeing the storage space, writing, by the storage manager, a second capacity planning record of the plurality of capacity planning records, wherein the second capacity planning record includes a current usage field and a space needed to be freed field; and collecting a set of data points from the plurality of capacity planning records; fitting a curve to a set of data points; and determining a point of intersection of the curve to a capacity level when actual data growth exceeds the capacity level.

17. The method of claim 16 further comprising:

determining, by the storage manager, whether the current usage is greater than the high threshold value of the selected storage pool;

in response to a determination that the current usage is greater than the high threshold value of the selected storage pool, attempting, by the storage manager, to free a storage space, and determining whether the storage manager was successful in freeing the storage space; and in response to a determination that the storage manager was not successful in freeing the storage space, issuing, by the storage manager, an alert that the current usage is greater than the high threshold value of the selected storage pool.

18. The method of claim 16 further comprising:

analyzing the first capacity planning record to determine actual data growth.

19. The method of claim 7 further comprising:

determining a time approximately when actual data growth exceeds a capacity level.

20. The method of claim 19, wherein the time approximately when actual data growth exceeds the capacity level is determined by the point of intersection of the fitted curve to the capacity level.

21. The system of claim 14 further comprising: determining, by the storage manager, a rate of actual data growth using the space needed to be freed field of one or more of the plurality of capacity planning records.

22. The system of claim 21 further comprising: determining a time approximately when actual data growth exceeds the capacity level.

* * * * *

UNITED STATES PATENT AND TRADEMARK OFFICE
CERTIFICATE OF CORRECTION

PATENT NO.        : 8,260,831 B2                                  Page 1 of 1
APPLICATION NO.   : 11/394802
DATED             : September 4, 2012
INVENTOR(S)       : John Charles Tyrrell It is certified that error appears in the above-identified patent and that said Letters Patent is hereby corrected as shown below:

IN THE CLAIMS

In col. 20, line 42 should read:
-- planning records; --.

In col. 22, line 2 should read:
-- ity planning records; --.

Signed and Sealed this
Eighteenth Day of June, 2013

Teresa Stanek Rea
*Acting Director of the United States Patent and Trademark Office*